(12) United States Patent
Shaik et al.

(10) Patent No.: US 11,788,020 B2
(45) Date of Patent: Oct. 17, 2023

(54) CONFIGURATION FOR OLEFINS AND AROMATICS PRODUCTION

(71) Applicants: LUMMUS TECHNOLOGY LLC, Houston, TX (US); Saudi Aramco Technologies Company, Dhahran (SA); Chevron Lummus Global LLC, Richmond, CA (US)

(72) Inventors: Kareemuddin Shaik, Houston, TX (US); Ujjal Mukherjee, Houston, TX (US); Essam Abdullah Al-Sayed, Houston, TX (US); Pedro Santos, Houston, TX (US); Theodorus Maesen, Houston, TX (US); Mazin Tamimi, Houston, TX (US); Julie Chabot, Houston, TX (US); Ibrahim Abba, Houston, TX (US); Kandasamy Sundaram, Houston, TX (US); Sami Barnawi, Houston, TX (US); Ronald M. Venner, Houston, TX (US)

(73) Assignees: LUMMUS TECHNOLOGY LLC, Houston, TX (US); Saudi Arabian Technology Company, Dhahran (SA); Chevron Lummus Global LLC, Richmond, CA (US)

( * ) Notice: Subject to any disclaimer, the term of this patent is extended or adjusted under 35 U.S.C. 154(b) by 0 days.

(21) Appl. No.: 17/812,808

(22) Filed: Jul. 15, 2022

(65) Prior Publication Data
US 2022/0348834 A1 Nov. 3, 2022

Related U.S. Application Data

(62) Division of application No. 16/820,249, filed on Mar. 16, 2020, now Pat. No. 11,390,817.

(Continued)

(51) Int. Cl.
*C10G 69/06* (2006.01)
*B01D 3/06* (2006.01)
(Continued)

(52) U.S. Cl.
CPC ............ *C10G 69/06* (2013.01); *B01J 19/245* (2013.01); *C10G 9/36* (2013.01); *C10G 21/003* (2013.01);
(Continued)

(58) Field of Classification Search
None
See application file for complete search history.

(56) References Cited

U.S. PATENT DOCUMENTS 3,240,695 A * 3/1966 Robert .................... C10G 47/00
208/68
5,215,649 A * 6/1993 Grenoble ............... C10G 47/34
208/48 R (Continued)

*Primary Examiner* — Tam M Nguyen
(74) *Attorney, Agent, or Firm* — Osha Bergman Watanabe & Burton LLP

(57) ABSTRACT

Processes herein may be used to thermally crack various hydrocarbon feeds, and may eliminate the refinery altogether while making the crude to chemicals process very flexible in terms of crude. In embodiments herein, crude is progressively separated into at least light and heavy fractions. Depending on the quality of the light and heavy fractions, these are routed to one of three upgrading operations, including a fixed bed hydroconversion unit, a fluidized catalytic conversion unit, or a residue hydrocracking unit that may utilize an ebullated bed reactor. Products from the upgrading operations may be used as feed to a steam cracker.

13 Claims, 7 Drawing Sheets

Related U.S. Application Data

(60) Provisional application No. 62/819,229, filed on Mar. 15, 2019, provisional application No. 62/819,315, filed on Mar. 15, 2019, provisional application No. 62/819,247, filed on Mar. 15, 2019, provisional application No. 62/819,270, filed on Mar. 15, 2019, provisional application No. 62/819,282, filed on Mar. 15, 2019.

(51) Int. Cl.

| | |
|---|---|
| *B01J 19/24* | (2006.01) |
| *C10L 1/08* | (2006.01) |
| *C10G 45/26* | (2006.01) |
| *C10G 45/32* | (2006.01) |
| *C10G 45/44* | (2006.01) |
| *C10G 49/22* | (2006.01) |
| *C10G 65/12* | (2006.01) |
| *C10G 9/36* | (2006.01) |
| *C10G 47/30* | (2006.01) |
| *C10G 49/02* | (2006.01) |
| *C10G 21/00* | (2006.01) |
| *C10G 47/26* | (2006.01) |
| *C10G 55/04* | (2006.01) |
| *B01D 19/00* | (2006.01) |

(52) U.S. Cl.
CPC ............. *C10G 45/26* (2013.01); *C10G 45/32* (2013.01); *C10G 45/44* (2013.01); *C10G 47/26* (2013.01); *C10G 47/30* (2013.01); *C10G 49/02* (2013.01); *C10G 49/22* (2013.01); *C10G 55/04* (2013.01); *C10G 65/12* (2013.01); *C10L 1/08* (2013.01); *B01D 3/06* (2013.01); *B01D 19/0057* (2013.01); *B01J 2219/0004* (2013.01); *C10G 2300/1044* (2013.01); *C10G 2300/1048* (2013.01); *C10G 2300/202* (2013.01); *C10G 2300/205* (2013.01); *C10G 2300/206* (2013.01); *C10G 2300/301* (2013.01); *C10G 2300/302* (2013.01); *C10G 2300/308* (2013.01); *C10G 2300/40* (2013.01); *C10G 2300/4006* (2013.01); *C10G 2300/4081* (2013.01); *C10G 2300/807* (2013.01); *C10G 2400/20* (2013.01); *C10G 2400/22* (2013.01); *C10G 2400/30* (2013.01)

(56) References Cited

U.S. PATENT DOCUMENTS

| | | | |
|---|---|---|---|
| 2018/0155638 A1* | 6/2018 | Al-Ghamdi | C10G 7/06 |
| 2018/0155639 A1* | 6/2018 | Al-Ghamdi | C10G 69/08 |
| 2018/0155642 A1* | 6/2018 | Al-Ghamdi | C10G 69/08 |
| 2018/0155643 A1* | 6/2018 | Al-Ghamdi | C10G 9/36 |
| 2018/0223197 A1* | 8/2018 | Al-Ghamdi | C10G 47/24 |
| 2021/0079305 A1* | 3/2021 | Al-Ghamdi | C10L 1/08 |
| 2021/0246389 A1* | 8/2021 | Koseoglu | C10G 69/14 |
| 2023/0115510 A1* | 4/2023 | Carp | C10G 69/06 |
| | | | 208/68 |

* cited by examiner

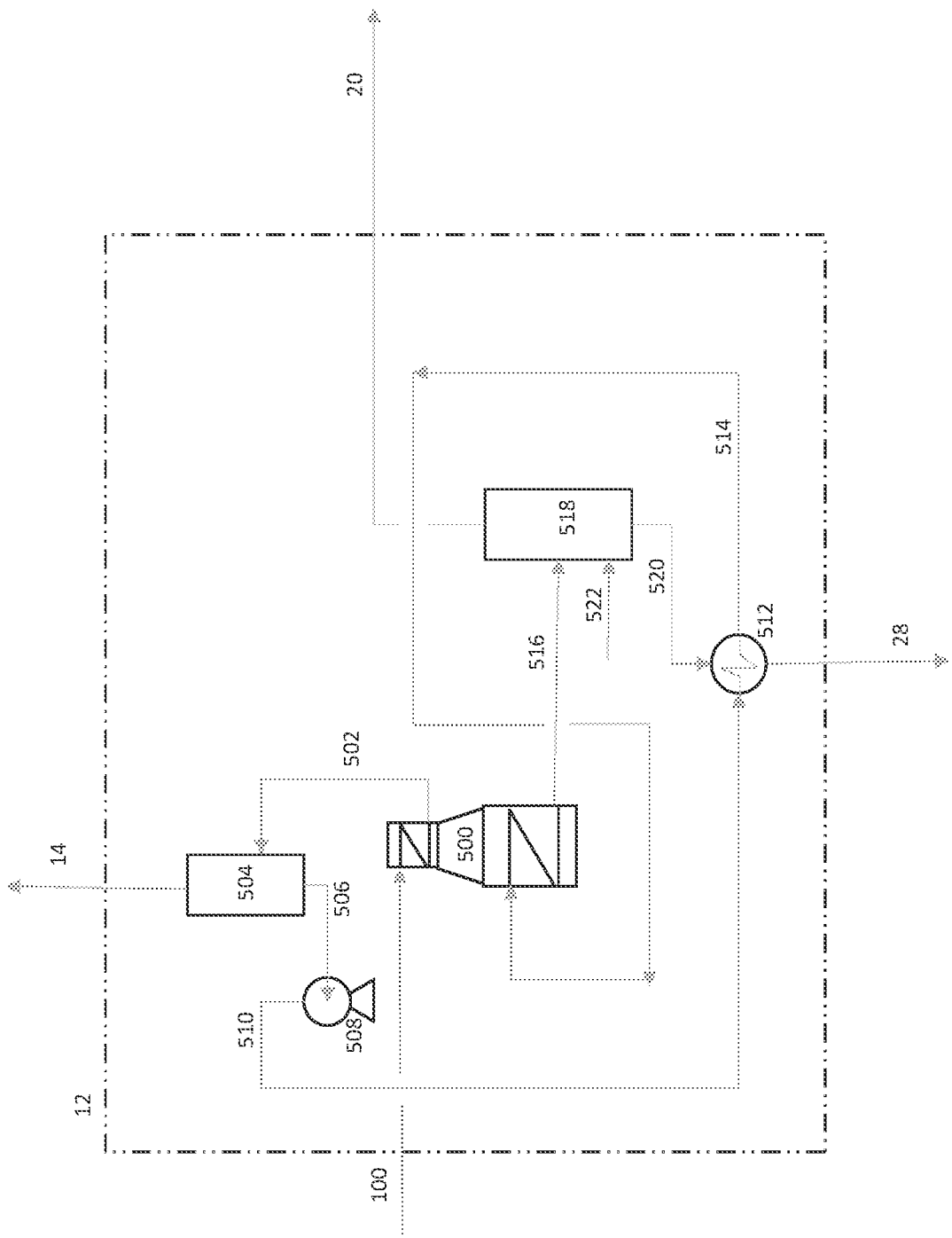

CONFIGURATION FOR OLEFINS AND AROMATICS PRODUCTION

CROSS-REFERENCE TO RELATED APPLICATIONS

This application, pursuant to 35 U.S.C. § 119(e), claims priority to U.S. Provisional Application Ser. Nos. 62/819,270, 62/819,282, 62/819,247, 62/819,229, and 62/819,315, each filed Mar. 15, 2019, and each of which is herein incorporated by reference in its entirety.

FIELD OF THE DISCLOSURE

Embodiments herein relate to processes and systems for producing petrochemicals, such as olefins and aromatics, from crude oil and low value heavy hydrocarbon streams.

BACKGROUND

High-boiling compounds in crude oil may cause significant operational issues if they are sent to a steam cracker. High boiling compounds have a propensity to form coke, due in large part to their high asphaltene content. Therefore, the high boiling compounds are typically removed before sending the lighter fractions to different petrochemicals units, such as a steam cracker or an aromatic complex. The removal process, however, increases the capital cost of the overall process and lowers profitability, as the removed high-boiling compounds can only be sold as low-value fuel oil. In addition, conversion of vacuum residue without significant formation of HPNAs that are detrimental to steam cracker furnaces downstream of the process has been a challenge to date.

U.S. Pat. No. 3,617,493 describes a process in which crude oil is sent to the convection section of a steam cracker and then to a separation zone, where the portion of the feed boiling below about 450° F. is separated from the rest of the feed and then sent, with steam, into the high temperature portion of the steam cracker and subjected to cracking conditions.

U.S. Pat. No. 4,133,777 teaches a process in which feed oil initially flows downwardly in trickle flow through a fixed bed of HDM catalysts, and then passes downwardly through a fixed bed of promoted catalysts containing selected GROUP VI and GROUP VIII metals, with very little hydrocracking occurring in this combination process.

U.S. Pat. No. 5,603,824 disclosed a process of upgrading a waxy hydrocarbon feed mixture containing sulfur compounds which boils in the distillate range, in order to reduce sulfur content and 85% point while preserving the high octane of naphtha by-products and maximizing distillate yield. The process employs a single, downflow reactor having at least two catalyst beds and an inter-bed redistributor between the beds. The top bed contains a hydrocracking catalyst, preferably zeolite beta, and the bottom bed contains a dewaxing catalyst, preferably ZSM-5.

U.S. Pat. No. 3,730,879 discloses a two-bed catalytic process for the hydrodesulfurization of crude oil or a reduced fraction, in which at least 50 percent of the total pore volume of the first-bed catalytic consists of pores in the 100-200 Angstrom diameter range.

U.S. Pat. No. 3,830,720 discloses a two-bed catalytic process for hydrocracking and hydrodesulfurizing residual oils, in which a small-pore catalyst is disposed upstream of a large-pore catalyst.

U.S. Pat. No. 3,876,523 describes a novel catalyst and a process for catalytically demetalizing and desulfurizing hydrocarbon oils comprising residual fractions. The process described therein utilizes a catalyst comprising a hydrogenation component, such as cobalt and molybdenum oxides, composited on an alumina. Although this catalyst is highly effective for demetalization of residual fractions and has good stability with time on stream, its utility is remarkably improved when this catalyst is employed in a particular manner in combination with a second catalyst having different critical characteristics. A catalyst of the type described in U.S. Pat. No. 3,876,523 will be referred as a first catalyst, it being understood that this first catalyst is to be situated upstream of the second catalyst having different characteristics.

U.S. Pat. No. 4,153,539 discloses that improved hydrogen utilization and/or higher conversions of desired product is obtained in hydrotreating or hydrocracking processes when using amphora particles for hydrotreating of light hydrocarbon fractions, catalytic reforming, fixed-bed alkylation processes, and the like.

U.S. Pat. No. 4,016,067 discloses that hydrocarbon oils, preferably residual fractions, are catalytically hydroprocessed to very effectively remove both metals and sulfur and with particularly slow aging of the catalyst system by contacting the oil sequentially with two catalysts of different characteristics. The first catalyst, located upstream of the second catalyst, is characterized by having at least 60% of its pore volume in pores greater than 100 A. in diameter and other characteristics hereinafter specified. The second catalyst, located downstream with respect to the first catalyst, is characterized by having a major fraction of its pore volume in pores less than 100 A. in diameter.

The dual catalyst apparatus of U.S. Pat. No. 4,016,067 is used to demetallize and/or desulfurize any hydrocarbon oil that has metals and/or sulfur content-undesirably high for a particular application. The dual catalyst apparatus is particularly effective for preparing low metals and/or low sulfur content feedstocks for catalytic cracking or for coking. In the processing to remove metals and sulfur, and hydrocarbon oil also is concomitantly enriched in hydrogen, making it an even more suitable chargestock for either of these processes.

U.S. Pat. No. 10,017,702 discloses a process for thermally cracking whole crudes. The whole crude may be partially divided into multiple fractions and the separate fractions may be fed to a steam cracker through individual radiant coils.

US PG PUB 2019-0023999 A1 discloses separation of a crude into a light cut and a heavy cut. The light cut is then fed to a steam cracker, and the totality of the heavy cut is hydrotreated and/or hydrocracked.

In general, these and other prior processes for converting whole crudes typically convert less than 50 percent of the crude to the more desirable end products, including petrochemicals such as ethylene, propylene, butenes, pentenes, and light aromatics, for example. Generally, 20 percent of the whole crude is removed up front in processing, removing the heaviest components that are hard to convert. About another 20 percent of the whole crude is typically converted to pyrolysis oil, and about 10 percent is over-converted to methane.

SUMMARY

A process for converting whole crudes and other wide boiling hydrocarbon streams to produce olefins and/or aromatics, the process including: separating a whole crude into at least a light boiling fraction, a medium boiling fraction, and a high boiling residue fraction; hydrocracking the high boiling residue fraction to form a hydrocracked effluent, and separating the hydrocracked effluent to produce a resid hydrocracked fraction and a fuel oil fraction; destructively hydrogenating the medium boiling fraction to form a first destructively hydrogenated effluent; destructively hydrogenating the resid hydrocracked fraction to produce a second destructively hydrogenated effluent; mixing the first and second destructively hydrogenated effluents to form a mixture and hydrocracking the mixture to form produce a hydrotreated and hydrocracked effluent; and feeding the hydrotreated and hydrocracked effluent and the light boiling fraction to at least one of a steam cracker and an aromatics complex to convert hydrocarbons therein into petrochemicals and a pyrolysis oil and/or an ultra-low sulfur fuel oil (ULSFO).

A system for converting whole crudes and other wide boiling hydrocarbon streams to produce olefins and/or aromatics, the system including: a separation system for separating a whole crude into at least a light boiling fraction, a medium boiling fraction, and a high boiling residue fraction; a hydrocracker for hydrocracking the high boiling residue fraction to form a hydrocracked effluent, and separating the hydrocracked effluent to produce a resid hydrocracked fraction and a fuel oil fraction; a first conditioning reactor for destructively hydrogenating the medium boiling fraction to form a first destructively hydrogenated effluent; a second conditioning reactor for destructively hydrogenating the resid hydrocracked fraction to produce a second destructively hydrogenated effluent; a mixer for mixing the first and second destructively hydrogenated effluents to form a mixture and a hydrocracker for hydrocracking the mixture to form produce a hydrotreated and hydrocracked effluent; one or more flow lines for feeding the hydrotreated and hydrocracked effluent and the light boiling fraction to at least one of a steam cracker and an aromatics complex to convert hydrocarbons therein into petrochemicals and a pyrolysis oil and/or an ultra-low sulfur fuel oil (ULSFO).

Other aspects and advantages will be apparent from the following description and the appended claims.

BRIEF DESCRIPTION OF DRAWINGS

FIG. 7 is a simplified process flow diagram of a system for converting whole crudes and heavy hydrocarbons according to embodiments herein.

DETAILED DESCRIPTION

Figure 1:
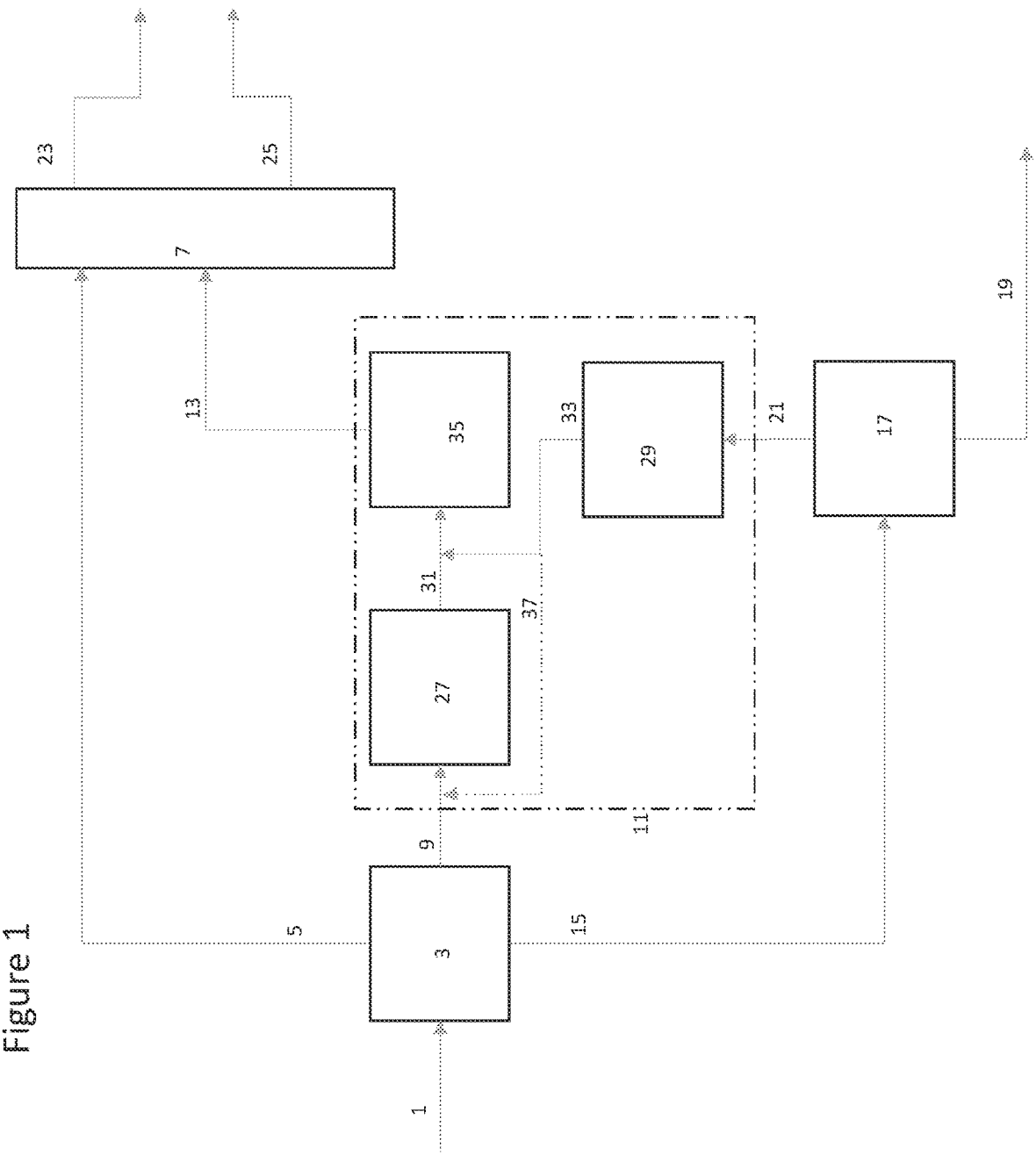
FIG. 1 is a simplified process flow diagram of a system for converting whole crudes and heavy hydrocarbons according to embodiments herein.

As used herein, the term "petrochemicals" refers to hydrocarbons including light olefins and diolefins and C6-C8 aromatics. Petrochemicals thus refers to hydrocarbons including ethylene, propylene, butenes, butadienes, pentenes, pentadienes, as well as benzene, toluene, and xylenes. Referring to a subset of petrochemicals, the term "chemicals," as used herein, refers to ethylene, propylene, butadiene, 1-butene, isobutylene, benzene, toluene, and para-xylenes.

Hydrotreating is a catalytic process, usually carried out in the presence of free hydrogen, in which the primary purpose when used to process hydrocarbon feedstocks is the removal of various metal contaminants (e.g., arsenic), heteroatoms (e.g., sulfur, nitrogen and oxygen), and aromatics from the feedstock. Generally, in hydrotreating operations cracking of the hydrocarbon molecules (i.e., breaking the larger hydrocarbon molecules into smaller hydrocarbon molecules) is minimized. As used herein, the term "hydrotreating" refers to a refining process whereby a feed stream is reacted with hydrogen gas in the presence of a catalyst to remove impurities such as sulfur, nitrogen, oxygen, and/or metals (e.g. nickel, or vanadium) from the feed stream (e.g. the atmospheric tower bottoms) through reductive processes. Hydrotreating processes may vary substantially depending on the type of feed to a hydrotreater. For example, light feeds (e.g. naphtha) contain very little and few types of impurities, whereas heavy feeds (e.g. ATBs) typically possess many different heavy compounds present in a crude oil. Apart from having heavy compounds, impurities in heavy feeds are more complex and difficult to treat than those present in light feeds. Therefore, hydrotreating of light feeds is generally performed at lower reaction severity, whereas heavy feeds require higher reaction pressures and temperatures.

Hydrocracking refers to a process in which hydrogenation and dehydrogenation accompanies the cracking/fragmentation of hydrocarbons, e.g., converting heavier hydrocarbons into lighter hydrocarbons, or converting aromatics and/or cycloparaffins (naphthenes) into non-cyclic branched paraffins.

"Conditioning" and like terms as used herein refers to conversion of hydrocarbons by one or both of hydrocracking and hydrotreating. "Destructive hydrogenation" and like terms refers to cracking of the hydrocarbon molecular bonds of a hydrocarbon, and the associated hydrogen saturation of the remaining hydrocarbon fragments, which can create stable lower boiling point hydrocarbon oil products, and may be inclusive of both hydrocracking and hydrotreating.

"API gravity" refers to the gravity of a petroleum feedstock or product relative to water, as determined by ASTM D4052-11.

Embodiments herein relate to processes and systems that take crude oil and/or low value heavy hydrocarbons as feed and produces petrochemicals, such as light olefins (ethylene, propylene, and/or butenes) and aromatics. More specifically, embodiments herein are directed toward methods and systems for making olefins and aromatics by thermal cracking of a pre-conditioned crude oil or condensate. Processes herein may condition the residuum fraction of whole crude oils and natural condensates to produce feedstocks useful as a steam cracker feedstock.

The integration of conditioning, fractionation, and steam cracking may result in a highly efficient facility, and in some embodiments may convert greater than 55%, greater than 60%, greater than 65%, greater than 70%, greater than 75%, greater than 80%, or greater than 85% of the whole crude to petrochemicals. In other embodiments, the integration of conditioning, fractionation, and steam cracking may result in a highly efficient facility, and in some embodiments may convert greater than 55%, greater than 60%, greater than 65%, greater than 70%, greater than 75%, greater than 80% or greater than 85% of the whole crude to chemicals. Embodiments herein may thus provide systems and processes for conditioning feeds including even the heaviest, most undesirable residuum components into components that can be vaporized and passed into the radiant section of a steam cracker, substantially improving over the low petrochemical conversion of prior processes.

Hydrocarbon mixtures useful in embodiments disclosed herein may include various hydrocarbon mixtures having a boiling range, where the end boiling point of the mixture may be greater than 500° C., such as greater than 525° C., 550° C., or 575° C. The amount of high boiling hydrocarbons, such as hydrocarbons boiling over 550° C., may be as little as 0.1 wt %, 1 wt % or 2 wt %, but can be as high as 10 wt %, 25 wt %, 50 wt % or greater. The description is explained with respect to crude oil, such as whole crude oil, but any high boiling end point hydrocarbon mixture can be used. However, processes disclosed herein can be applied to crudes, condensates and hydrocarbons with a wide boiling curve and end points higher than 500° C. Such hydrocarbon mixtures may include whole crudes, virgin crudes, hydroprocessed crudes, gas oils, vacuum gas oils, heating oils, jet fuels, diesels, kerosenes, gasolines, synthetic naphthas, raffinate reformates, Fischer-Tropsch liquids, Fischer-Tropsch gases, natural gasolines, distillates, virgin naphthas, natural gas condensates, atmospheric pipestill bottoms, vacuum pipestill streams including bottoms, wide boiling range naphtha to gas oil condensates, heavy non-virgin hydrocarbon streams from refineries, vacuum gas oils, heavy gas oils, atmospheric residuum, hydrocracker wax, and Fischer-Tropsch wax, among others. In some embodiments, the hydrocarbon mixture may include hydrocarbons boiling from the naphtha range or lighter to the vacuum gas oil range or heavier.

When the end boiling point of the hydrocarbon mixture may be high, such as over 550° C. in some embodiments, the hydrocarbon mixture cannot be processed directly in a steam pyrolysis reactor to produce olefins. The presence of these heavy hydrocarbons results in the formation of coke in the reactor, where the coking may occur in one or more of the convection zone preheating coils or superheating coils, in the radiant coils, or in transfer line exchangers, and such coking may occur rapidly, such as in few hours. Whole crude is not typically cracked commercially, as it is not economical. It is generally fractionated, and only specific cuts are used in a steam pyrolysis heater to produce olefins. The remainder is used in other processes. The cracking reaction proceeds via a free radical mechanism. Hence, high ethylene yield can be achieved when it is cracked at high temperatures. Lighter feeds, like butanes and pentanes, require a high reactor temperature to obtain high olefin yields. Heavy feeds, like gas oil and vacuum gas oil (VGO), require lower temperatures. Crude contains a distribution of compounds from butanes to VGO and residue (material boiling over 550° C.). Subjecting the whole crude without separation at high temperatures produces a high yield of coke (byproduct of cracking hydrocarbons at high severity) and plugs the reactor. The steam pyrolysis reactor has to be periodically shut down and the coke is cleaned by steam/air decoking. The time between two cleaning periods when the olefins are produced is called run length. When whole crude is cracked without separation, coke can deposit in the convection section coils (vaporizing the fluid), in the radiant section (where the olefin producing reactions occur) and/or in the transfer line exchanger (where the reactions are stopped quickly by cooling to preserve the olefin yields).

Processes and systems according to embodiments herein may include a feed preparation section, a crude conditioning section, an aromatic complex, and a steam cracker. The feed preparation section may include a desalter, for example.

The desalted crude is then conditioned and processed such that crackable feed is being sent to a steam cracker and/or an aromatic complex. The conditioning section may allow an operator to maximize the petrochemicals yield while maintaining a reasonable decoking frequency of the furnaces. Another objective of the crude conditioning unit is to ensure complete or essentially complete (95%+) conversion of asphaltenes to lower boiling point components that enhance the petrochemicals yield while reducing the formation of heavy polynuclear aromatics (HPNAs).

Processes according to embodiments herein may thus convert heavier fractions of crude oil into high-value petrochemicals and may minimize the amount of hydrocarbons sent to a fuel oil pool, which substantially increases profitability. The small fuel oil pool that is produced may also be upgraded into a low-sulfur, IMO 2020 compliant fuel oil, further increasing the value of the products.

As noted above, high-boiling compounds in the crude oil may cause significant operational issues if they are sent to a steam cracker, due to their propensity to form coke, mainly because of their high asphaltene content. Therefore, the high boiling compounds are typically removed before sending the lighter fractions to different petrochemicals units, such as a steam cracker and aromatic complex. The removal process increases the capital cost of the overall process and lowers profitability, as the removed high-boiling compounds can only be sold as low-value fuel oil. In addition, conversion of vacuum residue without significant formation of HPNAs that are detrimental to steam cracker furnaces downstream of the process has been a challenge to date in the industry. Processes and systems according to embodiments herein may overcome these challenges.

The configurations of systems and processes for the conversion of whole crudes and heavy hydrocarbons according to embodiments described herein may efficiently handle resid conversion while maximizing the petrochemicals conversion and maintaining lower coking propensity in the steam cracker. This is achieved by integrating a resid hydrocracking reactor to the crude conditioning process, enabling conversion of high boiling compounds to lighter components. Resid hydrocracking units according to embodiments herein may include fixed bed resid hydrocracking units, ebullated bed resid hydrocracking reactors, as well as slurry bed resid hydrocracking reactors, in various embodiments.

The upgraded crude streams from the crude conditioning unit, such as from a fixed bed crude conditioning unit and a hydrocracker, are suitable feedstocks for the steam cracker as well as an aromatic complex. Such may lead to decreasing the overall process yields of low value fuel oil and increasing the yields of high value olefins and aromatics, such as benzene, toluene, and xylenes (BTX).

Separation of various fractions, such as a low boiling hydrocarbon fraction (a 160° C.– fraction, for example), a middle boiling fraction (a 160-490° C. fraction, for example), and a high boiling fraction (a 490° C.+ fraction, for example) may enhance the capital efficiency and operating costs of the processes and systems disclosed herein. While referring to three cuts in many embodiments herein, it is recognized by the present inventors that condensates, typically having a small amount of high boiling components, and whole crudes, having a greater quantity of high boiling components, may be processed differently. Accordingly, one, two, three or more individual cuts can be performed for the wide boiling range petroleum feeds, and each cut can be processed separately at optimum conditions.

Separation of the whole crude into the desired fractions may be performed using one or more separators (distillation columns, flash drums, etc.). In some embodiments, separation of the petroleum feeds may be performed in an integrated separation device (ISD), such as disclosed in US20130197283, which is incorporated herein by reference. In the ISD, an initial separation of a low boiling fraction is performed in the ISD based on a combination of centrifugal and cyclonic effects to separate the desired vapor fraction from liquid. An additional separation step may then be used to separate a middle boiling fraction from high boiling components.

Typically, hydrocarbon components boiling above 490° C. contain asphaltenes and Conradson Carbon Residue, and thus need to be processed appropriately, as described further below. While embodiments are described as including a fraction below about 90° C.-250° C., such as a 160° C.-fraction and a fraction above about 400° C.-560° C., such as a 490° C.+ fraction, it is noted that the actual cut points may be varied based on the type of whole crude or other heavy fractions being processed. For example, for a crude containing a low metals or nitrogen content, or a large quantity of "easier-to-process" components boiling, for instance, at temperatures up to 525° C., 540° C., or 565° C., it may be possible to increase the mid/high cut point while still achieving the benefits of embodiments herein. Similarly, the low/mid cut point may be as high as 220° C. in some embodiments, or as high as 250° C. in other embodiments. Further, it has been found that a low/mid cut point of about 160° C. may provide a benefit for sizing and operation of the reactors, such as a fixed bed conditioning reactor, for conditioning the mid fraction hydrocarbons (middle cut). Further still, for some feeds, such as condensate, the low/mid cut point may be as high as 565° C. The ability to vary the cut points may add flexibility to process schemes according to embodiments herein, allowing for processing of a wide variety of feeds while still producing the product mixture desired.

Accordingly, in some embodiments, the light cut may include hydrocarbons having a boiling point up to about 90° C. (e.g., a 90° C.– fraction), up to about 100° C., up to about 110° C., up to about 120° C., up to about 130° C., up to about 140° C., up to about 150° C., up to about 160° C., up to about 170° C., up to about 180° C., up to about 190° C., up to about 200° C., up to about 210° C., up to about 220° C., up to about 230° C., up to about 240° C., up to about 250° C. (e.g., a 250° C.– fraction), up to about 300° C., up to about 350° C., up to about 400° C., up to about 500° C., or up to about 565° C. Embodiments herein also contemplate the light cut being hydrocarbons having boiling points up to temperatures intermediate the aforementioned ranges.

Depending upon the fractionation mechanism used, the light hydrocarbon "cut" may be relatively clean, meaning the light fraction may not have any substantial amount (>1 wt % as used herein) of compounds boiling above the intended boiling temperature target. For example, a 160° C.– cut may not have any substantial amount of hydrocarbon compounds boiling above 160° C. (i.e., >1 wt %). In other embodiments, the intended target "cut" temperatures noted above may be a 95% boiling point temperature, or in other embodiments as an 85% boiling point temperature, such as may be measured using ASTM D86 or ASTM D2887, or a True Boiling Point (TBP) analysis according to ASTM D2892, for example, and ASTM D7169 for heavy streams, such as those boiling above about 400° C. In such embodiments, there may be up to 5 wt % or up to 15 wt % of compounds above the indicated "cut" point temperature. For many whole crudes, the low/mid cut point may be such that the light boiling fraction has a 95% boiling point temperature in the range from about 90° C. to about 250° C. For other feeds, however, such as condensate, the light boiling fraction may have a 95% boiling point temperature in the range from about 500° C. to about 565° C., for example.

In some embodiments, the middle cut may include hydrocarbons having a boiling point from a lower limit of the light cut upper temperature (e.g., 90° C., 100° C., 110° C., 120° C., 130° C., 140° C., 150° C., 160° C., 170° C., 180° C., 190° C., 200° C., 210° C., 220° C., 230° C., 240° C., 250° C., 300° C., 350° C., or 400° C., for example) to an upper limit of hydrocarbons having a boiling point up to about 350° C., up to about 375° C., up to about 400° C., up to about 410° C., up to about 420° C., up to about 430° C., up to about 440° C., up to about 450° C., up to about 460° C., up to about 480° C., up to about 490° C., up to about 500° C., up to about 520° C., up to about 540° C., up to about 560° C., or up to about 580° C. As used herein, for example, a middle cut having a lower limit of 160° C. and an upper limit of 490° C. may be referred to as a 160° C. to 490° C. cut or fraction. Embodiments herein also contemplate the middle cut being hydrocarbons having boiling points from and/or up to temperatures intermediate the aforementioned ranges.

Depending upon the fractionation mechanism, the hydrocarbon "cut" for the middle cut may be relatively clean, meaning the middle cut may not have any substantial amount (>1 wt %) of compounds boiling below and/or may not have any substantial amount (>1 wt %) of compounds boiling above the intended boiling temperature target limits. For example, a 160° C. to 490° C. cut may not have any substantial amount of hydrocarbon compounds boiling below 160° C. or above 490° C. In other embodiments, the intended target "cut" temperatures noted above may be a 5 wt % or 15 wt % boiling point temperature on the lower limit and/or a 95% or 85% boiling point temperature on the upper limit, such as may be measured using ASTM D86 or ASTM D2887, or a True Boiling Point (TBP) analysis according to ASTM D2892, for example, and ASTM D7169 for heavy streams, such as those boiling above about 400° C. In such embodiments, there may be up to 5 wt % or up to 15 wt % of compounds above and/or below the "cut" point temperature, respectively.

In some embodiments, the heavy cut may include hydrocarbons having a boiling point above about 350° C., above about 375° C., above about 400° C. (e.g., a 400° C.+ fraction), above about 420° C., above about 440° C., above about 460° C., above about 480° C., above about 490° C., above about 500° C., above about 510° C., above about 520° C., above about 530° C., above about 540° C., above about 560° C., above about 580° C., above about 590° C., above about 600° C. (e.g., a 600° C.+ fraction), or above about 700° C. Embodiments herein also contemplate the heavy cut being hydrocarbons having boiling points above temperatures intermediate the aforementioned temperatures.

Depending upon the fractionation mechanism, the heavy hydrocarbon "cut" may be relatively clean, meaning the heavy fraction may not have any substantial amount (>1 wt %) of compounds boiling below the intended boiling temperature target. For example, a 490° C.+ cut may not have any substantial amount of hydrocarbon compounds boiling below 490° C. In other embodiments, the intended target "cut" temperatures noted above may be a 95% boiling point temperature, or in other embodiments as an 85% boiling point temperature, such as may be measured using ASTM D86 or ASTM D2887, or a True Boiling Point (TBP) analysis according to ASTM D2892, for example, and ASTM D7169 for heavy streams, such as those boiling above about 400° C. In such embodiments, there may be up to 5 wt % or up to 15 wt % of compounds, respectively, below the "cut" point temperature.

While examples below are given with respect to limited temperature ranges, it is envisioned that any of the temperature ranges prescribed above can be used in the processes described herein. Further, with respect to cut points, those referred to in the examples below may be clean, as described above, or may refer to 5% or 15% boiling temperatures for lower limits, or may refer to 85% or 95% boiling temperatures for upper limits.

Following fractionation, the light cut, such as a 160° C.-cut, may be fed to a steam cracker section of the system with or without further processing. The light cut fed to the steam cracker section may include light naphtha and lighter hydrocarbons, for example, and in some embodiments may include heavy naphtha boiling range hydrocarbons.

The mid-range hydrocarbon cut may be conditioned using one or more fixed bed reactors, such as hydrotreating and/or hydrocracking reactors, each of which may destructively hydrogenate the hydrocarbons in the mid-cut. The conditioning reactors may include catalysts for metals removal, sulfur removal, nitrogen removal, and the conditioning in these reactors may overall add hydrogen to the hydrocarbon components, making them easier to process downstream to produce petrochemicals. The fixed bed catalyst systems in the mid-cut conditioning zone, for example, may contain different layers of demetalizing, destructive hydrogenation and mesoporous zeolite hydrocracking catalysts to optimize the conversion of the heavy materials to a balance between a highly paraffinic stream that is suitable for olefins production and a rich in aromatics stream that is suitable for aromatics production.

In some embodiments, it may be desirable to further separate the mid-cut into a low-mid cut and a high-mid cut. For example, a mid-cut having a boiling range from 160° C. to 490° C. may be divided into a low-mid cut having a boiling range from about 160° C. to about 325° C. and a high-mid cut having a boiling range from about 325° C. to about 490° C. The conditioning trains may thus be configured to more selectively convert the hydrocarbon components in the respective low and high mid cuts to the desired conditioned effluents, where each train may be configured based on preferred catalysts to destructively hydrogenate the hydrocarbons therein, reactor sizing for expected feed volumes and catalyst lifetime, as well as operating conditions to achieve the desired conversions to naphtha range containing steam cracker feedstocks. Similarly, division of the mid cut into three or more sub-cuts is also contemplated.

The hydrocarbons in the heavy cut may also be conditioned using one or more fixed bed reactors, slurry reactors, or ebullated bed reactors. Conditioning of the heavy cut, such as 490° C.+ hydrocarbons, may be performed, for example, in a residue hydrocracker, and may enhance the conversion of low value streams to high value petrochemical products via steam cracking. Residue hydrocracking may be performed, for example, in a fixed bed residue hydrocracker, an ebullated bed reactor, such as an LC-FINING or LC-MAX reactor system, as well as slurry reactors, such as LC-SLURRY reactors, each available from Chevron Lummus Global. It is recognized, however, that the lifetime of destructive hydrogenation and/or hydrocracking catalysts may be negatively impacted by heavier components, such as where the feed includes components boiling above 565° C., for example. Similar to the mid-cut, division of the heavy cut into one or more sub-cuts is also contemplated.

The crude conditioning section, inclusive of the mid- and heavy-cut conditioning, is designed to achieve four (4) goals. First, the crude conditioning section may be used to increase the concentration of paraffins and naphthenes in the crude. Second, the conditioning section may decrease the concentration of polynuclear aromatic hydrocarbons (PNAs) in the crude. Third, the conditioning section may reduce the final boiling point (FBP) of the crude to below 540° C. And, fourth, the conditioning section may minimize the vacuum residue fraction of the crude oil.

Embodiments herein, when conditioning the middle and heavy fractions, may target conversion of the heavier hydrocarbons to form hydrocarbons lighter than diesel, for example. The destructive hydrogenation catalysts and operating conditions may thus be selected to target the conversion of the hydrocarbons, or the hydrocarbons in the respective fractions, to primarily (>50 wt %) naphtha range hydrocarbons, such as greater than 60 wt % naphtha range hydrocarbons, or such as greater than 70 wt % naphtha range hydrocarbons. The use of catalysts and operating conditions in the conditioning sections to target lighter hydrocarbon products may enhance the operability of the steam cracker and the production of petrochemicals.

In some embodiments, conditioning of the heavy cut, such as a 490° C.+ cut, may result in conversion of at least 70 wt % of the compounds boiling in excess of 565° C. to lighter boiling compounds. Other embodiments may result in conversion of greater than 75 wt %, greater than 80 wt %, or greater than 85 wt % of the compounds boiling in excess of 565° C. to lighter boiling compounds.

In some embodiments, conditioning of the middle cut, such as a 160° C. to 490° C. cut, may result in conversion of greater than 50 wt % of the hydrocarbons therein to naphtha range hydrocarbons. In other embodiments, conditioning of the middle cut may result in conversion of greater than 55 wt %, greater than 60 wt %, or greater than 65 wt %, or greater than 70 wt % of the hydrocarbons therein to naphtha range hydrocarbons.

In some embodiments, collective conditioning of the middle cut and the heavy cut may result in an overall conversion of greater than 50 wt % of the hydrocarbons therein to naphtha range hydrocarbons. In other embodiments, conditioning of the middle cut and the heavy cut may result in conversion of greater than 55 wt %, greater than 60 wt %, or greater than 65 wt % of the hydrocarbons therein to naphtha range hydrocarbons.

As a result of such initial separations and conditioning, feeds to the steam cracker may be fed, in some embodiments, directly to the steam cracker without further processing. The light cut, having preferred properties, including one or more of boiling point, API, BMCI, hydrogen content, nitrogen content, sulfur content, viscosity, MCRT, or total metals content, may be fed directly to the steam cracker following separations in some embodiments. Effluents from the middle cut conditioning may also be fed directly to the steam cracker according to embodiments herein. Likewise, effluents from the heavy cut conditioning may be fed directly to the steam cracker in some embodiments.

The conditioning of the respective fractions as described herein may allow for the steam cracker, even while processing multiple feeds of varying boiling point ranges, to run for an extended period of time. In some embodiments, the steam cracker may be able to run for an uninterrupted run length of at least three years; at least four years in other embodiments; and at least five years in yet other embodiments.

Further, the initial hydrocarbon cut points, reactor sizes, catalysts, etc. may be adjusted or configured such that a run time of the steam cracker operations and conditioning processes may be aligned. The catalysts, reactor sizes, and conditions may be configured such that a run time of the conditioning unit is aligned with the run time of the steam cracker. Catalyst volumes, catalyst types, and reaction severity may all play a role in determining conditioning unit run times. Further, the extent of conditioning of the heavier hydrocarbons in the crude may impact coking in the thermal steam cracker. To maximize plant uptime, embodiments herein contemplate design and configuration of the overall system such that the conditioning system has a similar anticipated run time as the steam cracker for a given feedstock or a variety of anticipated feedstocks. Further, embodiments herein contemplate adjustment of reaction conditions (cut point, T, P, space velocity, etc.) in the conditioning section and/or the steam cracker based on a feedstock being processed, such that a run time of the conditioning section and the steam cracker are similar or aligned.

Alignment of run times may result in minimal downtime, such as where a catalyst turnover in a conditioning reactor is conducted concurrently with decoking of the steam cracker. Where the conditioning systems include multiple reactors or types of reactors, alignment of the run times may be based on the expected steam cracker performance. Further, where a hydrotreater, for example, may have a significantly longer run time than a hydrocracker in the conditioning section, parallel reactor trains and/or bypass processing may be used such that the overall run times of the conditioning and steam cracking units may be aligned.

Bypass processing may include, for example, temporarily processing a heavy (e.g., 490° C.+) cut in a reactor that normally processes a lighter feedstock, such as a mid-cut or a heavy mid-cut fraction. The heavier feedstock is anticipated to have more severe conditions and shorter catalyst life, and thus temporarily processing the heavies in a mid-range hydrocarbons conditioning reactor during a heavies catalyst change may allow the whole crude feed to continue to be fed to the steam cracker, without a shutdown, while the heavies conditioning reactor catalyst is replaced. Configuration of the mid-range conditioning reactors may also take into account the anticipated bypass processing when designing the overall system for aligned run times.

Recognizing that fixed bed conditioning may be detrimental to the light ends of some feedstocks, it may be desirable to perform an initial separation, such that the heavier components are conditioned for steam cracker feed while the lighter components, already suitable for steam cracker feed, are not further conditioned. Referring now to FIG. 1, a simplified process flow diagram of a system for converting whole crudes and heavy hydrocarbons according to embodiments herein is illustrated.

A wide boiling range hydrocarbon feed, such as a desalted crude 1, may be fed to a separation system 3. Separation system 3 may be an integrated separation device (ISD), as described above, and including separation and heat integration, for example. In separation system 3, the desalted crude 1 may be separated into three fractions, including (a) a light cut, such as a 160° C.– fraction 5 that doesn't require any conditioning and can be used as feed to the steam cracker section 7; (b) a middle cut, such as a 160-490° C. fraction 9 that may be upgraded in a conditioning section 11 to produce lighter hydrocarbons, such as a highly paraffinic stream 13 suitable for processing in the steam cracking section 7; and, (c) a heavy cut, such as a 490° C.+ fraction 15, which contains the most refractory materials in the crude, and which can be upgraded in a residue hydrocracker 17. Other cut points may also be used to route the desired fractions and hydrocarbons therein to desired units for conditioning and/or steam cracking. The residue hydrocracker may produce an ultra-low sulfur fuel oil 19 and a stream 21 that is suitable to be fed to the conditioning system for further conditioning and to produce additional hydrocarbons suitable for conversion to petrochemicals in the steam cracker section 7. The processing of the feeds in the steam cracker section may produce one or more petrochemical streams 23, such as ethylene, propylene, and butene, among others, as well as a higher boiling pyrolysis oil fraction 25.

In some embodiments, the mid cut fraction, such as 160-490° C. stream, may be processed initially in a fixed bed destructive hydrogenation reactor 27. The 490° C.+ stream may be processed in residue hydrocracking reactor system 17, which may include one or more reactors, such as utilizing an ebullated bed extrudate catalyst or slurry catalyst, which converts some of the hydrocarbons into lighter hydrocarbons, such as 490° C.– hydrocarbons. The additional lighter hydrocarbons may be treated in a fixed bed destructive hydrogenation reactor, which may be the same reactor used to condition the mid cut, or, as illustrated, a separate fixed bed destructive hydrogenation reactor 29 that may contain a catalyst tailored to effectively condition the once-converted hydrocarbons received from the residue hydrocracking. The reaction products 31, 33 from the hydrotreated middle cut (e.g., a 160-490° C. stream 9) and the hydrotreated lighter material (e.g., 490° C.– resid hydrocracker effluent), respectively from the fixed bed destructive hydrogenation reactors 27, 29, may then be combined and co-processed in a fixed bed hydrocracking reactor 35, producing a feedstock 13 suitable for processing in steam cracker section 17 for conversion into light olefins and other valuable petrochemicals. The unconverted portion of the resid hydrocracking reactor effluent may be processed, for example, in a fixed bed hydrodesulfurization unit (not illustrated) to produce ultra-low sulfur fuel oil (ULSFO).

In some embodiments, conditioning reactors 27 and 29 may include destructive hydrogenation catalysts (first stage conditioning), while conditioning reactors 35 include hydrocracking catalysts (second stage conditioning). Further, the first stage conditioning may, in some embodiments, include catalysts to target lowering a content of polynuclear aromatic compounds, thereby conditioning the feed to be more easily processed in the steam cracker.

Figure 2:
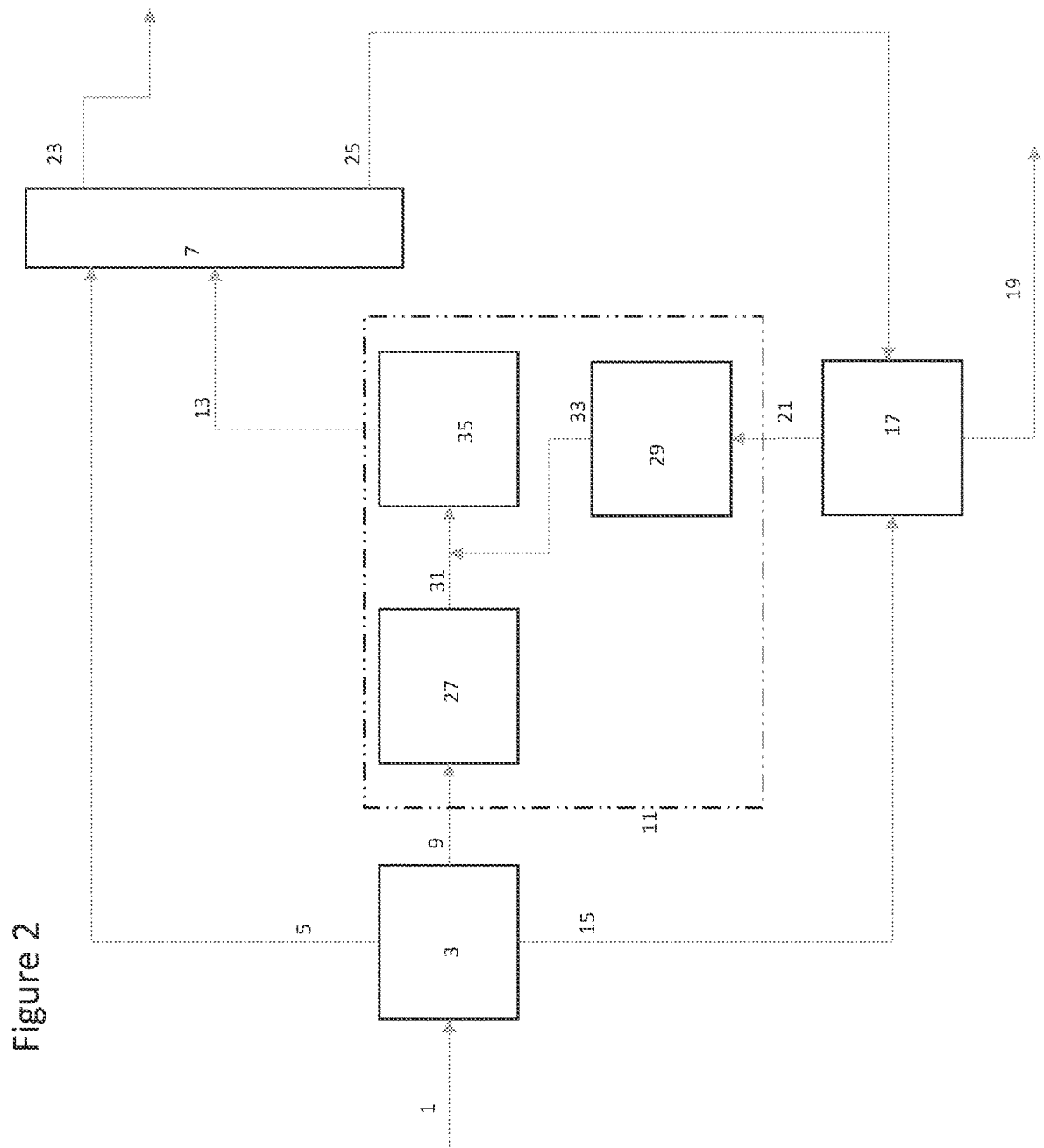
FIG. 2 is a simplified process flow diagram of a system for converting whole crudes and heavy hydrocarbons according to embodiments herein.

Referring now to FIG. 2, a simplified process flow diagram of a system for converting whole crudes and heavy hydrocarbons according to embodiments herein is illustrated, where like numerals represent like parts. In this embodiment, the desalted whole crude is processed similar to that as described above for FIG. 1. In this embodiment, the heavy cut, such as a 490° C.+ stream 15 and the pyrolysis oil stream 25 are combined and processed in the residue hydrocracking reactor(s) to convert some of the hydrocarbons in the streams into 490° C.– hydrocarbons, which is further processed in fixed bed destructive hydrogenation reactor 29.

As described above, the destructive hydrogenation reactors 27, 29 may be used to condition the middle cut, such as a 160-490° C. stream 9, and the effluent (such as a 490° C.–) stream 21 from the resid hydrocracking system 17. In some embodiments, the streams may be processed in the same destructive hydrogenation reactor. However, it has been found that, due to the nature of the feed compounds for various crudes, processing in a single reaction train may result in a stream with molecules that contain more aromatic rings than the molecules in straight run Arab Light or Arab extra light crudes in the same boiling range. As a result, more severe conditions may be necessary to sufficiently saturate the molecules, which has a negative impact on destructive hydrogenation catalyst life and/or capital investment. If the previously converted materials in stream 21 are co-processed with the straight run middle cut material in stream 9, the turnaround time for a single destructive hydrogenation train may drop below that of the steam cracking section, and/or a spare destructive hydrogenation train would be required to provide a steady stream of feed to the steam cracking section while the destructive hydrogenation catalyst system is undergoing regeneration and/or replacement. The aforementioned would also be applicable to other types of crude, such as desalted oils, condensate, biogenic oil, synthesis crude, tight oil, heavy hydrocarbons, reconstituted crudes, and bitumen derived oils.

To alleviate the issues of catalyst life/turnaround time, the fixed bed destructive hydrogenation step may be split into separate trains, as illustrated in FIGS. 1 and 2. One train may be provided for processing the straight run middle cut (160-490° C., for example) of the crude oil, and a second train may be provided for processing the (490° C.–, for example) effluent from the residue hydrocracking reactor(s). Generally, the reactors 27 in the first destructive hydrogenation step may have a turnaround time longer than that of a steam cracking furnace, and a spare reactor may not be required to maintain uptime. The reactors 29 in the second train may have more frequent turnarounds to replace catalyst, but it could have its feed redirected to the first train, such as via a flow line 37, during catalyst replacement, so it too would not require a spare reactor train for uptime. As a temporary diversion of feed, the impact on reactor train 27 would be minimal, and thus reactor trains 27 could be designed such that its turnarounds may be in sync with that of the steam cracker furnaces.

As noted above, various feedstocks may allow the cut points to be increased, such as raising the mid/high cut point from 490° C. to 545° C. in some embodiments. The same may be true with respect to processing in the resid hydrocracking system, where higher boiling point hydrocarbons may be able to be fed to the destructive hydrogenation reactor for conversion into feedstocks suitable for steam cracking. However, with respect to processing of the high boiling fraction (e.g., 490° C.+ or 545° C.+ fraction) in the resid hydrocracking system, it has been found that a lower cut point may be more favorable, as a cut point that is too high may require the use of a cutter oil to produce the ULSFO.

Figure 3:
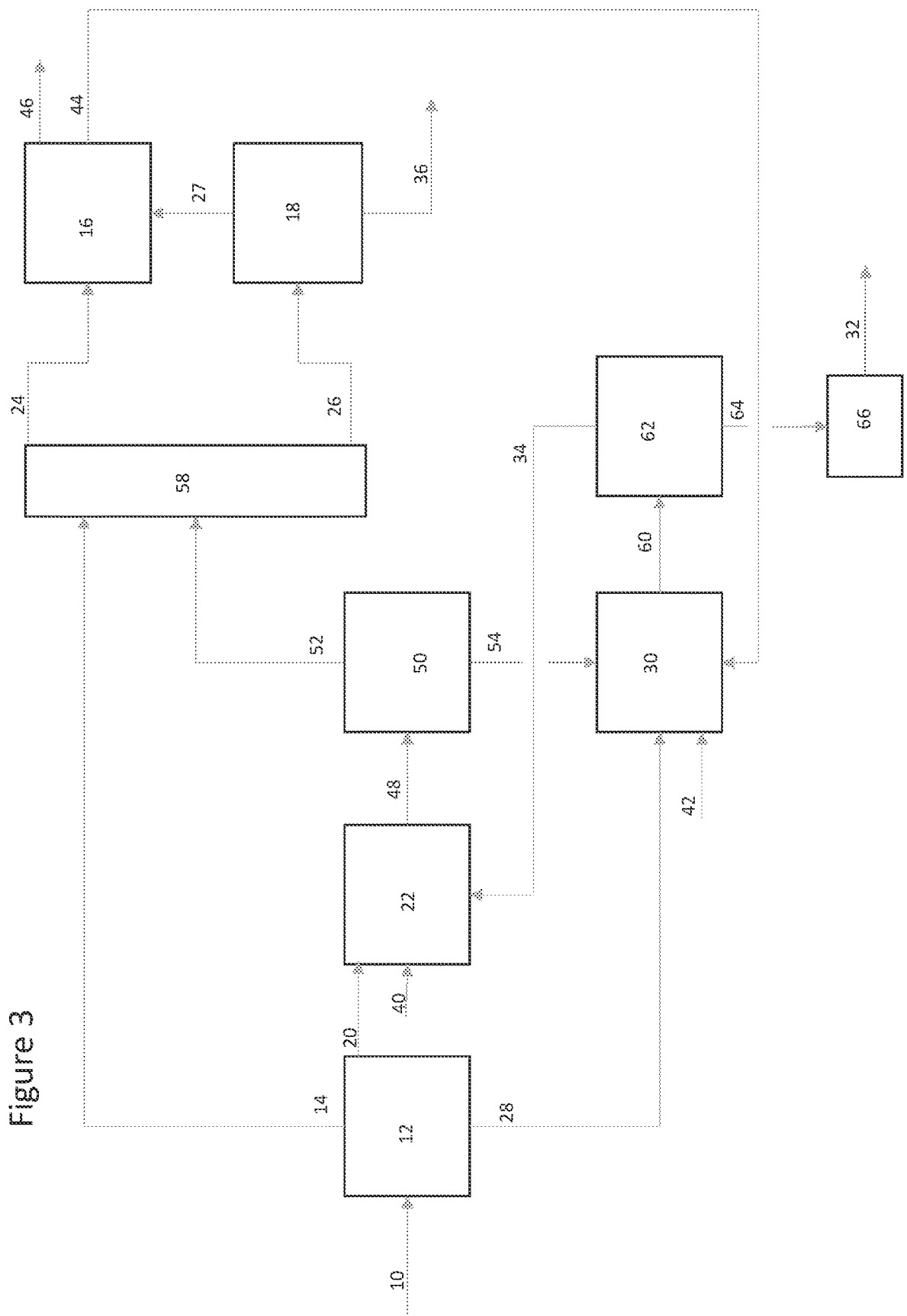
FIG. 3 is a simplified process flow diagram of a system for converting whole crudes and heavy hydrocarbons according to embodiments herein.

Referring now to FIG. 3, a simplified process flow diagram of a system for converting whole crudes and heavy hydrocarbons according to embodiments herein is illustrated.

A wide boiling range heavy hydrocarbon feed, such as a desalted crude 10, may be fed to a separation system 12. Separation system 12 may be an integrated separation device (ISD), as described above, for example. In separation system 12, the desalted crude 10 may be separated into three fractions, including (a) a light cut, such as a 160° C.– fraction 14, that doesn't require any conditioning and can be used as feed to the steam cracker 16 and the aromatic complex unit 18; (b) a middle cut, such as a 160-490° C. fraction 20, that may be upgraded in a fixed bed conditioning section 22 to produce two types of lighter streams, including a highly paraffinic stream 24 suitable for the steam cracking system 16, which may produce light olefins stream 46, and a stream 26 rich in aromatics that is suitable for aromatics production, which may produce aromatics stream 36, which may include benzene and para-xylenes; and, (c) a heavy cut, such as a 490° C.+ fraction 28, which contains the most refractory materials in the crude, which can be upgraded in an ebullated bed resid hydrocracker 30. Other cut points may also be used to route the desired fractions and hydrocarbons therein to desired units for conditioning and/or cracking. The ebullated bed resid hydrocracker may produce, for example, an ultra-low sulfur fuel oil 32 and a stream 34 that is suitable to be fed to the fixed bed conditioning system to produce the above mentioned two streams (the steam cracker feed 24 and the aromatic complex feed 26). As noted above, streams 20 and 34 may be processed in separate conditioning trains to advantageously provide similar life cycles of the catalysts and the steam cracker.

Other low value refinery streams may also be processed according to embodiments herein to produce ultimately higher value products. Such streams include some or all of the following types of hydrocarbons: (i) Light cycle oil (LCO), such as LCO that is produced from FCC unit, which can be fed via flow line 40 and processed in the fixed bed crude conditioning section 22 along with the middle cut, such as a 160-490° C. fraction 20; (ii) a Slurry Oil, such as a slurry oil that is produced from an FCC unit, which can be fed via flow line 42 and processed in the ebullated bed reactor 30 along with the heavy cut, such as 490° C.+ hydrocarbons, in stream 28; (iii) Pitch, such as a pitch that is produced from a solvent deasphalting unit, which can be fed via a same or different flow line 42 and processed in the ebullated bed reactor 30 along with the heavy cut (such as 490° C.+) hydrocarbons in stream 28; and/or (iv) a Pyrolysis fuel oil (Pyoil), such as a pyrolysis fuel oil that is produced from a stream cracker, including pyrolysis fuel oil stream 44 from steam cracker 16, which stream can be processed in the ebullated bed reactor 30 along with the heavy cut (e.g., 490° C.+) hydrocarbons in streams 28 and/or 42. Other various hydrocarbon streams of similar boiling ranges may also be co-processed to produce petrochemicals in systems disclosed herein, where such streams may include light naphthas, heavy naphthas, crude oils, atmospheric residues, vacuum residues, synthetic crude oils, and other hydrocarbon streams containing heavy hydrocarbons.

Following fixed bed conditioning of the middle cut fraction from stream 20, the effluent stream from resid hydrocracking system 30, and/or the LCO from stream 40 in fixed bed conditioning reactor train(s) 22, the reactor effluent(s) 48 may be fed to a separation system 50, such as an ISD, to recover a light boiling fraction 52 suitable for processing in the steam cracker 16 and aromatics complex 18, as well as a heavy boiling fraction 54. Heavy boiling fraction 54 may be fed to the resid hydrocracking system 30 for continued processing and conversion to lighter hydrocarbons, such as 490° C.– compounds. In some embodiments, separator 50 may provide a light fraction 52 having a cut point in the range from about 160° C. to about 220° C., and to provide a heavy fraction 54 having a corresponding lower cut point, such as 160° C.+ or 220° C.+ hydrocarbons.

Similarly, following processing of the heavy cut, such as a 490° C.+ fraction 28, in resid hydrocracking unit 30, the resid hydrocracker reactor effluent 60 may be fed to a separation system 62, such as an ISD, to recover a light boiling fraction 34 containing the conversion products suitable for processing in the fixed bed conditioning system 22, as well as a heavy boiling fraction 64. Heavy boiling fraction 64 may be fed to an integrated hydrotreater or hydrodesulfurization reactor 66 to produce the ULSFO 32. In some embodiments, separator 62 may provide a light fraction 34 having a cut point in the range from about 490° C. to about 520° C., and to provide a heavy fraction 64 having a corresponding cut point, such as 490° C.+ hydrocarbons.

The light boiling range fractions 14, 52 may be fed to a separator 58 for separation of the components into a light naphtha fraction 24 and a heavy naphtha fraction 26, for example. The light naphtha range components may then be processed in the steam cracker system 16 for producing petrochemicals, while the heavy naphtha range components may be processed in aromatics complex 18 to produce benzene, toluene, and xylenes, for example.

In some embodiments, the heavy naphtha 26 fraction may undergo treatment upstream of aromatics complex 18, such as a hydrogen sulfide treater (not illustrated) to further prepare the feed for conversion in the aromatics complex. Likewise, pyrolysis oil stream 44 may undergo a pyrolysis oil stabilization step (corresponding flow block not shown) before processing in the resid hydrocracking reactor.

As described briefly above, embodiments herein may allow for the direct cracking of crude oil to petrochemicals, forming light hydrocarbons like ethylene, propylene and light aromatics, in an economically viable manner, without passing through the conventional refining steps. Additionally, direct conversion of crude oil to petrochemicals may help close the widening supply-demand gap for key building blocks normally produced as co-products (propylene, butadiene) due to the increasing shift toward cracking lighter feedstock spurred by the shale gas revolution.

Integration of processing units according to embodiments herein may provide the unique potential for upgrading whole crudes, such as Arab Light crude and Arab Extra Light crude, along with low value refinery streams, such as Pyrolysis Oil (PyOil), slurry oil and Light Cycle Oil (LCO), into higher value petrochemical products. While conditioning of the feeds according to embodiments herein adds hydrogen to the feed components, and the hydrogen consumption is an added expense to the plant, the overall benefits in producing petrochemicals, rather than fuels, outweighs this added expense. The aforementioned would also be applicable to other types of crude, such as desalted oils, condensate, biogenic oil, synthesis crude, tight oil, heavy hydrocarbons, reconstituted crudes, and bitumen derived oils.

In various embodiments, an aromatics complex may be included, as noted above. For example, an aromatics complex may be used to convert the 160° C.-490° C. fraction, or a portion thereof, to aromatics. For example, a cut such as a 160° C. to 240° C. fraction may be processed to convert a portion of the hydrocarbons therein to aromatics, while the heavies may be fed to the steam cracker for conversion to petrochemicals. The aromatics complex feedstock generated via initial processing and conditioning according to embodiments herein may permit various processors to discontinue importing full range naphtha (FRN).

Further, in some embodiments, the pyrolysis oil generated in the steam cracking unit may be separated to recover a pyrolysis gasoline fraction, and one or more heavies fractions, such as a pyrolysis gas oil fraction and a pyrolysis fuel oil fraction. The lighter pyrolysis gasoline faction may be fed to an aromatics unit, while the heavier fractions may be used to form an ULSFO, as noted above.

Embodiments herein provide a strategic combination of crude feed preparation, crude separation, crude conditioning, and steam cracking technology to maximize the yield of high value petrochemicals. The crude conditioning section employs a combination of fixed bed hydroprocessing and liquid circulation, and ebullated or slurry bed residue hydrocracking to condition the crude into a suitable steam cracker feed and to upgrade the low value refinery streams. Embodiments herein may achieve a yield of petrochemicals in the range of 60% to 90% of the whole crude feedstock, for example.

As described above, after desalting, the crude may be segregated into three cuts, including: a light cut (such as a 160° C.– stream), which may then be further separated into 90° C.– and 90-160° C. cuts to feed a steam cracking heater and aromatics complex, respectively); a mid-cut (such as a 160-490° C. stream); and a heavy cut (such as a 490° C.+ stream). The light cut (such as a 160° C.– stream) does not require upgrading, and thus can be directly routed as steam cracker and aromatic complex feedstock. The mid cut (160-490° C. stream, for example) is easily handled in a fixed bed destructive hydrogenation/conditioning reaction system, in which the feed is hydrotreated and converted to naphtha, making an ideal steam cracker feedstock 24 and an aromatics complex feedstock 26.

The heavy cut (490° C.+ stream, for example) contains the most difficult compounds in the crude to be processed, including asphaltenes, metals, and Conradson Carbon Residue (CCR). In fixed bed down-flow reactors, the conversion and catalyst run length are typically limited by the metals, CCR, and asphaltenes content in residue feeds, and which results in rapid fouling of catalyst and increase of pressure drop. Embodiments herein may employ an upward flow expanded bed reactor to overcome the pressure drop issue and permit the process to operate with uninterrupted flow for long periods at high residue conversions. As such, the heavy cut, for example a 490° C.+ stream, may be processed in some embodiments in a liquid circulation, ebullated bed reactor, such as LC-FINING Technology available from Lummus Technology LLC. LC-SLURRY reactor technology available from Chevron Lummus Global may also be used to handle even heavier streams, such as pitch.

The crude conditioning section may contain four reaction stages, including ebullated bed reactors (such as LC-FINING Reactors), first and second Stage Hydrocracking Reactors, and a Heavy Oil Destructive Hydrogenation Reactor. These four reaction stages may operate within a single, common recycle gas circulation loop. Integration of these crude conditioning stages accomplishes the key processing objectives of upgrading low value refinery streams, eliminating the need to import full range naphtha (FRN), and providing steam cracker feed for production of incremental ethylene, while minimizing hydrogen consumption, investment and operating costs.

Figure 4:
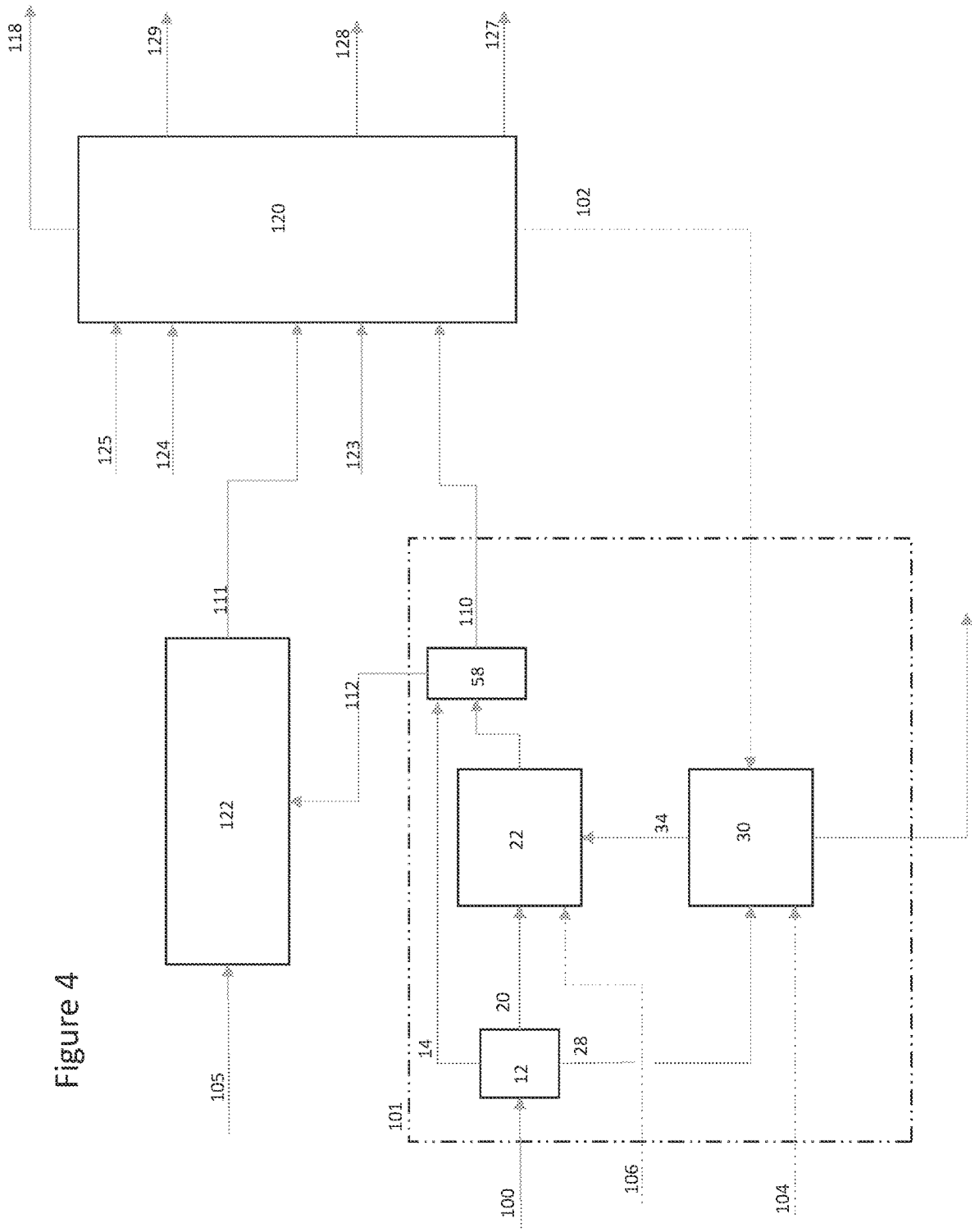
FIG. 4 is a simplified process flow diagram of a system for converting whole crudes and heavy hydrocarbons according to embodiments herein.

Referring now to FIG. 4, a simplified flow diagram of processes for producing olefins and aromatics according to embodiments herein is illustrated, where like numerals represent like parts. As an exemplary feed, an Arab Light crude 100 may be processed to produce sufficient Light Naphtha (110) to produce incremental ethylene as part of stream 118 in a mixed feed steam cracker (MFC) 120, in addition to a feedstock 112 for an aromatics complex 122. Other feeds to the mixed feed steam cracker may include, for example, a Raffinate-2 stream 123, propane 124, reactive organic gas (ROG) 125, and the mixed feed steam cracker may produce PyOil 102, pyrolysis gasoil 127, mixed C4s 128, propylene 129, and ethylene 118, among other products. FIG. 4 provides an overall process sketch highlighting the major equipment and stream routing of one possible configuration according to embodiments herein. While Arab Light is given as an example, the aforementioned would also be applicable to other types of crude, such as desalted oils, condensate, biogenic oil, synthesis crude, tight oil, heavy hydrocarbons, reconstituted crudes, and bitumen derived oils.

The feed streams to the feed conditioning section 101 may include, for example, an Arab Light Crude Oil 100, a pyrolysis oil 102 (PyOil), such as may be produced in the mixed feed cracker 120, a slurry oil 104, and a light cycle oil 106 (LCO). Embodiments herein, such as illustrated in FIG. 4, may produce the following products from the conditioning section: Steam Cracker Feedstock (such as 90° C.– hydrocarbons) 110; Aromatics Complex Feedstock (such as 90-160° C. hydrocarbons) 112; and Ultra Low Sulfur Fuel Oil (ULSFO) 114. Conditioning may also result in the generation of various byproducts, such as Fuel Gas, Sour Water, Rich Amine, and Desalter Brine, and may require the utilities such as Hydrogen, Stripped Sour Water, Lean Amine, Steam, Power, Cooling Water, Fuel Gas, Nitrogen, BFW, and a Feed Preparation Section, which may include desalting (each not illustrated).

Similar to other embodiments herein, the desalted crude 100 may initially be fed to a separator, such as an ISD 12. In separation system 12, the desalted crude 100 may be separated into three fractions, including (a) a light cut, such as a 160° C.– fraction 14, (b) a middle cut, such as a 160-490° C. fraction 20, that may be upgraded in a fixed bed conditioning section 22, which may include fixed bed hydrotreating and/or hydrocracking reactors, and (c) a heavy cut, such as a 490° C.+ fraction 28, which contains the most refractory materials in the crude and which can be upgraded in an ebullated bed resid hydrocracker 30.

The conditioned compounds, such as 490° C.– compounds produced in resid hydrocracker 30, may be fed via stream 34 for further conditioning in conditioning section 22. If desired, other full range naphtha feedstocks may be fed to the aromatics plant, such as via flow line 105.

Figure 5:
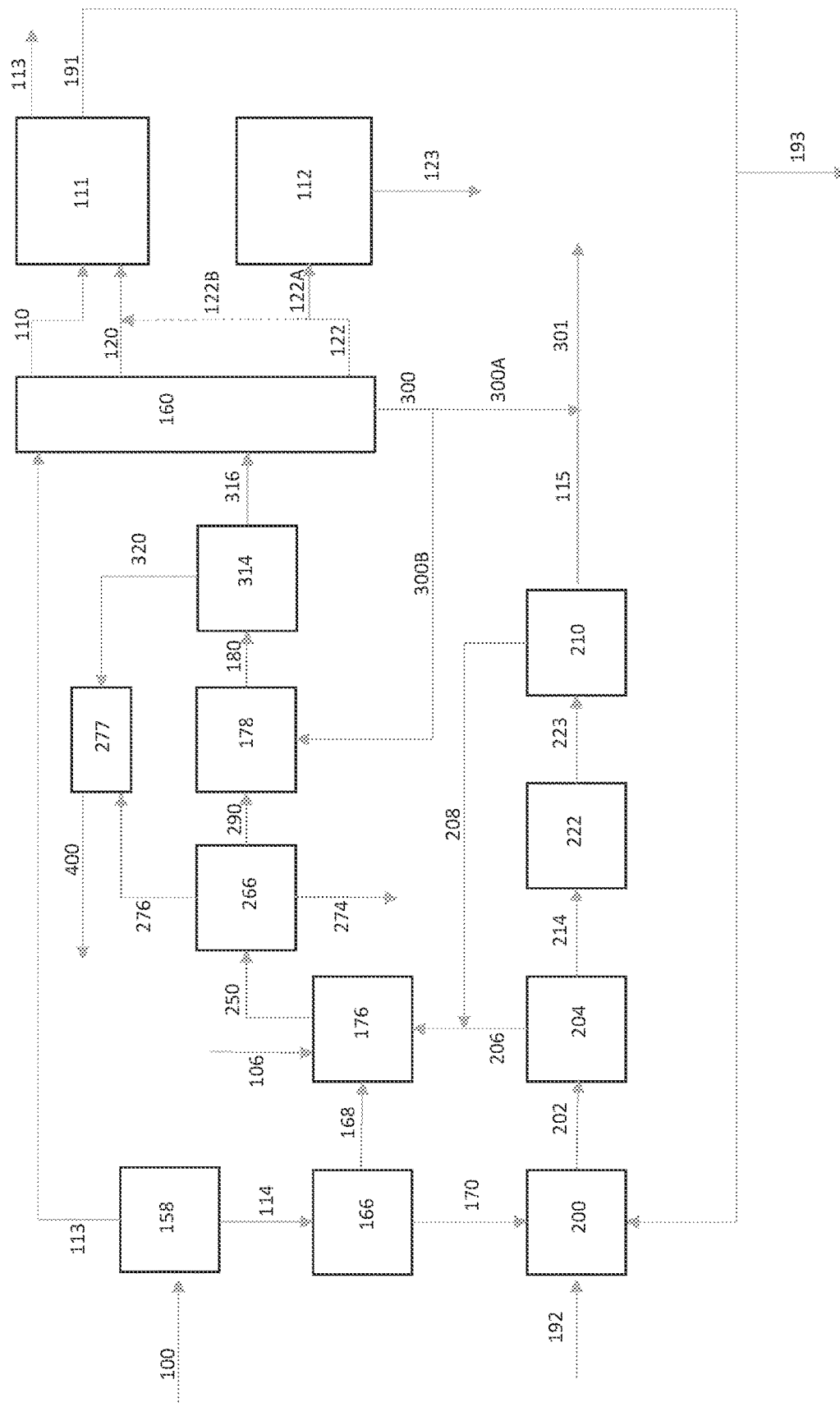
FIG. 5 is a simplified process flow diagram of a system for converting whole crudes and heavy hydrocarbons according to embodiments herein.

Referring now to FIG. 5, a desalted crude oil 100 may be separated, in a first Integrated Separation Device (ISD) 158, to recover a 160° C.– fraction 113. The integrated separation device 158 may operate, for example, at 200° C. and 8 barg, to enhance the vapor liquid separation efficiency. The ISD overhead vapor product 113 (such as a 160° C.– fraction cut of the crude oil) is routed to a product splitter 160. In the product splitter 160, the 160° C.– hydrocarbons, along with the hydrotreated product 316, or a portion thereof, may be separated into light (such as a 30° C.– or a 35° C.–) stream 120 a light naphtha stream (e.g., a 30-90° C. stream) 120, and a heavy naphtha (e.g., 90-160° C.) stream 122. The light stream 110 and light naphtha stream 120 may then be used as a steam cracker 111 feedstock to make an incremental amount of ethylene, or other product petrochemicals 113. The heavy naphtha 122 may be used as the feedstock 122A to the aromatics complex 112. In some embodiments, at least a portion 112B of the heavy naphtha 122 may be combined with the light naphtha 120 and fed to the steam cracker for production of additional petrochemicals 113 and/or pyoil 191. In other embodiments, all of the heavy naphtha 122 may be fed to the steam cracker 111 when the aromatics complex needs to be taken offline for servicing, or when there is insufficient benzene, toluene, and/or xylenes (BTX) in streams 113 and/or 316. Heavy naphtha feed routing may also be based on demand, for example.

The remaining 160° C.+ crude fraction 114 from the ISD 158 may be fed to a second separation system, such as a hot hydrogen stripper 166, where the 160° C.+ crude fraction is further separated into a mid-cut, such as a 160-490° C. fraction 168, and a heavy cut, such as a 490° C.+ fraction 170.

The heavy cut 170 (such as a 490° C.+ cut) contains the most difficult compounds which must be handled in the crude, including asphaltenes, metals, and CCR. The excessive amount of metals, CCR, and asphaltenes in the high boiling residue fraction may lead to rapid fouling of catalyst and increase of pressure drop in fixed bed down-flow reactors, limiting both conversion and catalyst run length. Employment of an upward flow expanded bed reactor may overcome the pressure drop issue and permits the process to operate with uninterrupted flow for long periods at high residue conversions. As such, the heavy cut, 490° C.+ stream, 170 may be processed in a liquid circulation, ebullated bed reactor system 200 in some embodiments.

The heavy cut 170 may be processed in the ebullated bed reactor system 200 together with one or more additional feeds, such as a slurry oil 192 and/or a pyoil 191. In some embodiments, the ebullated bed reactor system 200 may include a first ebullated bed reactor and a second ebullated bed reactor. In embodiments where not all of the pyoil 191 is recycled to the ebullated bed reactor system 200, pyoil may be removed from the system via stream 193.

The ebullated bed reactor system effluent 202 may be flashed in a High Pressure High Temperature (HP/HT) Separator 204. The vapor 206 from the HP/HT separator 204 may be combined with one or more of the mid-cut 168 from the second ISD 166, vapor 208 from a Heavy Oil Hydrotreating (HOHDT) HP/HT separator 210, and fed to the first stage fixed bed condition section 176. The liquid 214 from HP/HT separator 204 may be processed in a heavy oil destructive hydrogenation reactor 222. The heavy oil destructive hydrogenation reactor effluent 223 may be separated in the HOHDT separator 210. HOHDT liquid effluent 115 may be combined with a portion of product separator bottoms 300 (300A) to produce an ULSFO product 301.

The main objective of the first stage reaction system 176 is to hydrotreat the blended feed to reduce feed sulfur and nitrogen levels, partially convert to product, and prepare the feed for further processing in the second stage reactor 178. The liquid feed to the first stage reaction system 176 may be a blend of straight-run (SR), mid-cut, 160-490° C. crude fraction 166, the ebullated bed reactor distillate products 206, vapor 208 from the HOHDT separator 210, and LCO 106.

To meet the processing objective of removing feed sulfur and nitrogen and partially converting into a suitable steam cracker feedstock, the first stage reactor 176 may be loaded with a catalyst system consisting of demetalization, destructive hydrogenation, and hydrocracking catalysts. In order to control the temperature rise due to exothermic reactions, the catalysts may be separated into multiple beds within the reactor or into separate reactor vessels. Cold recycle gas (not illustrated) may be introduced between the beds or reactors to quench the reacting fluids and control the amount of temperature rise and rate of reaction.

The first stage reactor effluent 250 may consist of unconverted oil, distillates, naphtha, light ends, and excess hydrogen not consumed in the first state reactor 176. The first state reactor effluent stream 250 may be fed to a High Pressure Low Temperature (HP/LT) Separator 266. Any recovered sour water 274, containing $NH_3$ and/or $H_2S$, may be removed from the system. The hydrogen rich vapor 276 from the HP/LT separator 266 may be sent to a gas compression and distribution system 277. The gas compression and distribution system may clean and pressurize the hydrogen, and recycle the hydrogen gas to a common hydrogen header 400. While not illustrated, hydrogen in the common hydrogen header 400 may be fed to one or more of the ebullated bed conditioning system 200, first stage reaction system 176, second stage reaction system 178, heavy oil destructive hydrogenation reactor 222.

The hydrocarbon liquid 290 exiting the HP/LT separator 266 may be pumped to the second stage reaction section 178 for further conditioning, targeting maximum naphtha production. The objective of the second-stage reaction system 178 is to crack unconverted oil (UCO) from the first stage reaction section into lighter products. As such, the second stage reactor may be loaded with highly active hydrocracking catalyst. A portion of the product separator bottoms 300 (300B) may also be fed to the second stage reaction system 178 for additional conditioning.

The second stage reactor effluent 180 may be fed to a High Pressure Low Temperature (HP/LT) separator 314. The HP/LT liquid product 316 may be fed to the product splitter 160, and the vapor product 320 mixes with the hydrogen rich vapor 276 in the gas compression and distribution system 277. The recovered hydrogen and fresh hydrogen, if necessary, may then be routed from the gas compression and distribution system 277 to the various conditioning reactors as needed.

The 160° C.– product 113 from the integrated separation device 158 along with the HP/LT liquid product 316 may be fed into the product splitter 160. The product splitter 160 may separate the reactor effluent products into light fraction 110, a light naphtha fraction 120, and a heavy naphtha 122. The light naphtha product 110 is routed as feedstock to the steam cracker 111.

Heavy Naphtha product 122 may be taken as a side draw from the product splitter 160. A portion 112A of the heavy naphtha product 122 may pumped to the aromatics complex 112, and a portion 112B of the heavy naphtha product 122 may combined with the light naphtha fraction 120 and fed to the stream cracker 111.

Figure 6:
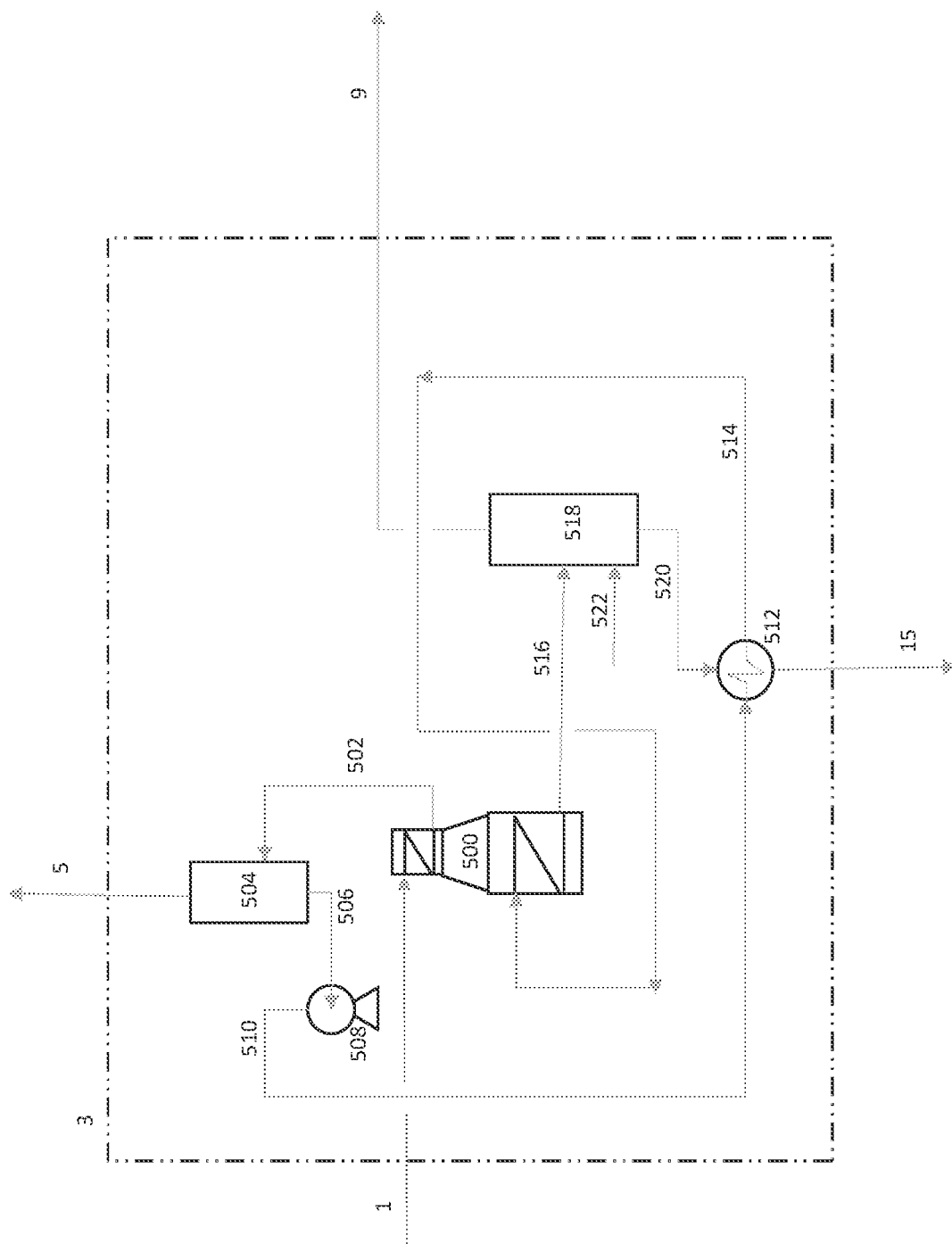
FIG. 6 is a simplified process flow diagram of a system for converting whole crudes and heavy hydrocarbons according to embodiments herein.

As described with respect to FIGS. 1 and 2, separation system 3 may be as illustrated in FIG. 6. Separation system 3 may be as described above and including separation and heat integration. After desalting, the crude 1 may be further preheated in the convection section of a heater 500 to produce a preheated crude 502. The preheated crude 502 may then be fed to a separator 504, which may facilitate the separation of the 160° C.– fraction 5 from heavier components, recovered in stream 506.

The remaining 160° C.+ crude fraction 506 may be fed to a pump 508, which produces a pressurized 160° C.+ crude fraction 510, which may then be fed to a heat exchanger 512. Heat exchanger 512 may preheat the 160° C.+ crude fraction 510 against hot hydrogen stripper bottoms 520, producing a pressurized and pre-heated 160° C.+ crude fraction 514. The pressurized and pre-heated 160° C.+ crude fraction 514 may then be fed back to the heater 500, where it is heated to facilitate the separation of a 160-490° C. fraction from a heavier 490° C.+ fraction. The heated 160° C.+ crude fraction 516 may then be fed to a hot hydrogen stripper 518. In the hot hydrogen stripper 518, the 160° C.+ crude fraction is further separated into a 160-490° C. fraction 9 and the hot hydrogen stripper bottoms 520, which contains heavier 490° C.+ hydrocarbons. The hot hydrogen stripper bottoms 520, after being cooled via indirect heat exchange in heat exchanger 512 against the pressurized 160° C.+ crude fraction 510, may be removed from the separation system 3 as the 490° C.+ fraction 15.

The hot hydrogen stripper 518 may utilize a hydrogen feed 522 as the stripping medium. The hot hydrogen stripper 518 may be operated to provide broad flexibility, based on the nature of the crude feedstock that is being processed. The stripper overheads, which is the 160-490° C. fraction 9, may be cooled, to recover hydrogen, and routed to the intermediate hydroprocessing reaction stages as appropriate, and as described with respect with FIGS. 1 and 2. The recovered hydrogen may be fed to a downstream pressure swing adsorption (PSA) unit (not shown), after amine treatment (not shown), to improve the hydrogen purity. The PSA hydrogen product may be compressed in a make-up hydrogen compressor (not shown) to provide the make-up hydrogen for the one or more hydroprocessing reactors (FIGS. 1 and 2), and as hot hydrogen feed 522.

The hot hydrogen stripper bottoms product 520 (such as a 490° C.+ cut) contains the most difficult compounds which must be handled in the crude, including asphaltenes, metals, and CCR. The excessive amount of metals, CCR, and asphaltenes in the high boiling residue fraction leads to rapid fouling of catalyst and increase of pressure drop in fixed bed down-flow reactors, limiting both conversion and catalyst run length. After cooling against the pressurized 160° C.+ crude fraction 510, the 490° C.+ stream 11 may be recovered and processed in a liquid circulation, ebullated bed residue hydrocracker, as described in FIGS. 1 and 2, along with any additional low value refinery streams, such as a pyoil stream and/or slurry oil stream.

By adjusting the amount of hydrogen 522 fed to the hot hydrogen stripper 518, as well as the operating conditions of the hot hydrogen stripper 518 and heater 500, the hydrocarbon cut points may be adjusted such that the light-cut 5 may be fed directly to the downstream steam cracker, and the mid-cut 9 may have little to no deleterious compounds that would rapidly foul the fixed bed conditioning reactors. In this way, the separation system 3 (with the hot hydrogen stripper 518) may concentrate the most difficult to process hydrocarbons in the heavy-cut 11, which may be fed to the ebullated bed reactors operating at severe conditions.

As described with respect to FIGS. 3 and 4, separation system 12 may be a separation system as illustrated in FIG. 7. Separation system 312 may be as described above and including separation and heat integration. After desalting, the crude 100 may be further preheated in the convection section of a heater 500 to produce a preheated crude 502. The preheated crude 502 may then be fed to a separator 504, which may facilitate the separation of the 160° C.– fraction 5 in the integrated separation system 3.

The remaining 160° C.+ crude fraction 506 may be fed to a pump 508, which produces a pressurized 160° C.+ crude fraction 510, which may then be fed to a heat exchanger 512. Heat exchanger 512 may preheat the 160° C.+ crude fraction 510 against hot hydrogen stripper bottoms 520, producing a pressurized and pre-heated 160° C.+ crude fraction 514. The pressurized and pre-heated 160° C.+ crude fraction 514 may then be fed back to the heater 500 where it is heated to facilitate the separation of a 160-490° C. fraction from a heavier 490° C.+. The heated 160° C.+ crude fraction 516 may then be fed to a hot hydrogen stripper 518. In the hot hydrogen stripper 518, the 160° C.+ crude fraction is further separated into a 160-490° C. fraction 20 and the hot hydrogen stripper bottoms 520, which contains heavier 490° C.+ hydrocarbons. The hot hydrogen stripper bottoms 520, after being cooled via indirect heat exchange in heat exchanger 512 against the pressurized 160° C.+ crude fraction 510, may be removed from the separation system 3 as the 490° C.+ fraction 28.

The hot hydrogen stripper 518 may utilize a hydrogen feed 522 as the stripping medium. The hot hydrogen stripper 518 may be operated to provide broad flexibility, based on the nature of the crude feedstock that is being processed. The stripper overheads, which is the 160-490° C. fraction 20, may be cooled, to recover hydrogen, and routed to the intermediate hydroprocessing reaction stages as appropriate, and as described with respect with FIGS. 3 and 4. The recovered hydrogen may be fed to a downstream pressure swing adsorption (PSA) unit (not shown), after amine treatment (not shown), to improve the hydrogen purity. The PSA hydrogen product may be compressed in a make-up hydrogen compressor (not shown) to provide the make-up hydrogen for the one or more hydroprocessing reactors (FIGS. 3 and 4), and as hot hydrogen feed 522.

The hot hydrogen stripper bottoms product 520 (such as a 490° C.+ cut) contains the most difficult compounds which must be handled in the crude, including asphaltenes, metals, and CCR. The excessive amount of metals, CCR, and asphaltenes in the high boiling residue fraction leads to rapid fouling of catalyst and increase of pressure drop in fixed bed down-flow reactors, limiting both conversion and catalyst run length. After cooling against the pressurized 160° C.+ crude fraction 510, the 490° C.+ stream 28 may be recovered and processed in a liquid circulation, ebullated bed residue hydrocracker, as described in FIGS. 3 and 4, along with any additional low value refinery streams, such as a pyoil stream and/or slurry oil stream.

By adjusting the amount of hydrogen 522 fed to the hot hydrogen stripper 518, as well as the operating conditions of the hot hydrogen stripper 518 and heater 500, the hydrocarbon cut points may be adjusted such that the light-cut 5 may be fed directly to the downstream steam cracker, and the mid-cut 20 may have little to no deleterious compounds that would rapidly foul the fixed bed conditioning reactors. In this way, the separation system 12 (with the hot hydrogen stripper 518) may concentrate the most difficult to process hydrocarbons in the heavy-cut 28 which may be fed to the ebullated bed reactors.

With respect to FIGS. 1-7 described above, the light-, mid-, and heavy-cut fractions are given with limited examples of 160° C.−, 160° C.-490° C., and 490° C.+. The cut points may be adjusted such that the light-cut may be fed directly to the steam cracker with little to no intermediate processing, and the mid- and heavy-cuts can be effectively processed within their respective reactor trains.

Steam crackers, including ethylene complexes, useful in embodiments herein may include various unit operations. For example, an ethylene complex may include a cracker, such as a steam cracker. Other cracking operations may also be used. The ethylene complex may also include an olefins recovery unit, a butadiene extraction unit, a MTBE unit, a C4 selective hydrogenation unit, a pyrolysis gasoline hydrotreating unit, an aromatics extraction unit, a metathesis unit, and/or a disproportionation unit, among others useful for the production and recovery of olefins and other light hydrocarbons. Products from the ethylene complex may include, for example, ethylene, propylene, butadiene, benzene, MTBE, and mixed xylenes, among others.

In some embodiments, the hydrocarbon streams to be cracked may be fed directly to the steam cracker. In other embodiments, the hydrocarbon streams noted above to be cracked may be separated into multiple fractions for separate processing (cracking, for example, at preferred temperatures, pressures, and residence times for each respective fraction).

The hydrocarbon feedstocks, which may be a single hydrocarbon or a mixture of hydrocarbons, may be introduced to a heating coil disposed in the convection section of a steam pyrolysis heater. In the heating coil, the hydrocarbon feedstock may be heated and/or vaporized via convective heat exchange with the exhaust.

If desired, the heated hydrocarbon feedstock may then be mixed with steam or an inert compound, such as nitrogen, carbon dioxide, or any other inorganic gases. Various portions of the process or additional processes in the plant may use low temperature or saturated steam, while others may use high temperature superheated steam. Steam to be used within the process or elsewhere in the plant may be heated or superheated via a heating coil (not shown) disposed in the convection zone of a steam pyrolysis heater.

The heated hydrocarbon mixture(s) may then be fed to a heating coil, which may be disposed at a lower elevation in the steam pyrolysis heater, and therefore at a higher temperature, than the convective zone heating coil noted above. The resulting superheated mixture may then be fed to one or more coils disposed in a radiant zone of the steam pyrolysis heater, operated at a temperature for partial conversion, via thermal cracking, of the hydrocarbon mixture. The cracked hydrocarbon product may then be recovered.

In some embodiments, multiple heating and separation steps may be used to separate the hydrocarbon mixture(s) to be cracked into two or more hydrocarbon fractions, if desired. This will permit conditioning and steam cracking of each cut optimally, such that the throughput, steam to oil ratios, heater inlet and outlet temperatures and other variables may be controlled at a desirable level to achieve the desired reaction results, such as to a desired product profile while limited coking in the radiant coils and associated downstream equipment. As various cuts, depending upon the boiling point of the hydrocarbons in the various feed streams, are separated and cracked, the coking in the radiant coils and transfer line exchangers can be controlled. As a result, the run length of the heater may be increased to many weeks, instead of few hours, with higher olefin production.

Following cracking in the radiant coils, one or more transfer line exchangers may be used to cool the products very quickly and generate (super) high pressure steam. One or more coils may be combined and connected to each exchanger. The exchanger(s) can be double pipe or multiple shell and tube exchanger(s).

Instead of indirect cooling, direct quenching can also be used. For such cases, oil may be injected at the outlet of the radiant coil. Following the oil quench, a water quench can also be used. Instead of oil quench, an all water quench is also acceptable. After quenching, the products are sent to a recovery section.

As described above, embodiments herein may separate a desalted crude or other wide boiling hydrocarbons into various fractions to effectively condition the respective fractions to form a feedstock suitable for conversion in a steam cracker. Because of the wide range of feedstocks that may be processed according to embodiments herein, depending upon the feedstock, conditioning catalysts, reactor volumes, and other factors for a given installation, it may be more preferential to base the specific cut points based on one or more additional properties of the feedstock. For example, the specific cut points may be adjusted based on one or more properties or additional properties of the crude feedstock, such as API gravity, Bureau of Mines Correlation Index (BMCI), hydrogen content, nitrogen content, sulfur content, viscosity, microcarbon residue (MCRT), and/or total metals, among other feedstock properties.

Various feedstocks useful in embodiments herein, such as crude oils, desalted oils, condensate, biogenic oil, synthetic crude, tight oil, heavy hydrocarbons, reconstituted crude and bitumen derived oil may have one or more of the following properties, including: an API gravity between 4 and 60°, a BMCI of 20 to 85, a hydrogen content of 9.0 to 14.5 wt % (or 90,000 to 145,000 ppm), a nitrogen content of 0.02 to 0.95 wt % (or 200 to 9,500 ppm), a sulfur content of 0.009 to 6.0 wt % (or 90 to 60,000 ppm), a viscosity, at 40° C., of 95 to 5500 centistokes (cSt), a MCRT of 5 to 35 wt %, and/or may have a total metals content of <1 to 1000 ppm.

The initial crude separations may be conducted and adjusted in order to have the light-, mid-, and heavy-cuts have specific, desirable initial properties, such that the light-cut may go to the steam cracker with no, or minimal, intermediate processing. Further, the mid to heavy cuts may be conducted and adjusted in order to have the mid-cut and heavy-cut have appropriate and/or favorable feed properties and hydrocarbon species so as to be effectively and efficiently conditioned in the mid and heavy conditioning reactors.

BMCI

In some embodiments, the light cut may have a BMCI of less than 20. In other embodiments, the light cut may have a BMCI of less than 15. In yet other embodiments, the light cut may have a BMCI of less than 10 or even less than 5. In some embodiments, the mid cut may have a BMCI of less than 40, such as less than 35, less than 30, or less than 25. In some embodiments, the heavy cut may have a BMCI of greater than 30, such as greater than 35, greater than 40, greater than 45, greater than 50, or greater than 55.

Accordingly, in some embodiments, a light cut, including hydrocarbons having a boiling point up to about 90° C. to about 300° C., for example, may have a BMCI of less than 20; in other embodiments, such as when the light cut includes hydrocarbons having a boiling point up to about 110° C. or up to about 250° C., for example, the light cut may have a BMCI of less than 10; in yet other embodiments, such as when the light cut includes hydrocarbons having a boiling point up to about 130° C. or up to about 220° C., for example, the light cut may have a BMCI of less than 5. In some embodiments where the light cut includes hydrocarbons having a boiling point below about 160° C., the light cut may have a BMCI of less than 5. While the BMCI may vary for the different feeds at any given cut temperature, a low BMCI, such as less than 10 or less than 5, for example, has been found to improve the processability of the light hydrocarbons in the steam pyrolysis unit without the need for intermediate processing. Light cuts for Arab light crudes processed according to embodiments herein may target a BMCI of less than 10, for example, and may target a BMCI of less than 6 or less than 5.5 for Arab extra light crudes, for example.

In some embodiments, the mid cut, including hydrocarbons having a lower boiling point in the range from about 90° C. to about 300° C. and an upper boiling point in the range from about 400° C. to about 600° C., may have a BMCI of between about 5 and 50. For example, the mid cut may have a BMCI of between a lower limit of 5, 10, 15, 20, or 25 to an upper limit of 10, 15, 20, 25, 30, 40, or 50. A mid-cut having a BMCI of between 10 and 30, for example, has been found to be convertible to steam cracker feeds using relatively moderate destructive hydrogenation conditions in the mid-cut conditioning section of processes herein. Mid-cuts for Arab light crudes processed according to embodiments herein may target a BMCI in the range from about 20 to about 30, for example, and may target a BMCI in the range from about 15 to about 30 for Arab extra light crudes, for example.

In various embodiments, the heavy cut, including hydrocarbons having a boiling point greater than about 300° C., may have a BMCI of greater than 30. When the heavy cut includes hydrocarbons having a boiling point above about 350° C., the heavy cut may have a BMCI of greater than 40. When the heavy cut includes hydrocarbons having a boiling point above about 400° C., the heavy cut may have a BMCI of greater than 50. In embodiments where the heavy cut includes hydrocarbons having a boiling point above about 490° C., the heavy cut may have a BMCI of greater than 55. A heavy-cut having a BMCI of greater than about 40, for example, has been found to be convertible to steam cracker feeds using the more severe destructive hydrogenation conditions in the heavy-cut conditioning section of processes herein. Heavy-cuts for Arab light crudes processed according to embodiments herein may target a BMCI in the range from about 50 to about 60, for example, and may target a BMCI in the range from about 25 to about 40 for Arab extra light crudes, for example.

API

In some embodiments, the light cut may have an API gravity of greater than 10°. In other embodiments, the light cut may have an API gravity of greater than 15°. In yet other embodiments, the light cut may have an API gravity of greater than 20°, greater than 30°, or even greater than 40°. In some embodiments, the mid cut may have an API gravity of greater than 100 and less than 40°, such as from a lower limit of 10°, 15°, 20°, 25°, or 30° to an upper limit of 25°, 30°, 35°, 40°, 45°, or 50°. In some embodiments, the heavy cut may have an API gravity of less than 40°, such as less than 35°, less than 25°, less than 20°, less than 15°, or less than 10°.

Accordingly, in some embodiments, a light cut, including hydrocarbons having a boiling point up to about 300° C., for example, may have an API gravity of greater than 10°; in other embodiments, such as when the light cut includes hydrocarbons having a boiling point up to about 250° C., for example, the light cut may have an API gravity of greater than 20°; in yet other embodiments, such as when the light cut includes hydrocarbons having a boiling point up to about 220° C., for example, the light cut may have an API gravity of greater than 40°. In some embodiments where the light cut includes hydrocarbons having a boiling point below about 160° C., the light cut may have a API gravity of greater than 60°. While the API gravity may vary for the different feeds at any given cut temperature, an API gravity, such as greater than 40°, greater than 50°, or greater than 60°, for example, has been found to improve the processability of the light hydrocarbons in the steam pyrolysis unit without the need for intermediate processing. Light cuts for Arab light crudes processed according to embodiments herein may target an API gravity of greater than 65°, for example, and may target an API gravity of greater than 600 for Arab extra light crudes, for example.

In some embodiments, the mid cut, including hydrocarbons having a lower boiling point in the range from about 90° C. to about 300° C. and an upper boiling point in the range from about 400° C. to about 600° C., may have an API gravity of between about 5° and 50°. For example, the mid cut may have a API gravity of between a lower limit of 5°, 10°, 15°, 20°, or 25° to an upper limit of 10°, 15°, 20°, 25°, 30°, 40°, or 50°. A mid-cut having a API gravity of between 200 and 40°, for example, has been found to be convertible to steam cracker feeds using relatively moderate destructive hydrogenation conditions in the mid-cut conditioning section of processes herein. Mid-cuts for Arab light crudes processed according to embodiments herein may target an API gravity in the range from about 300 to about 35°, for example, and may target an API gravity in the range from about 350 to about 400 for Arab extra light crudes, for example.

In various embodiments, the heavy cut, including hydrocarbons having a boiling point greater than about 300° C., may have an API gravity of less than about 40°. When the heavy cut includes hydrocarbons having a boiling point above about 350° C., the heavy cut may have an API gravity of less than about 20°. When the heavy cut includes hydrocarbons having a boiling point above about 400° C., the heavy cut may have an API gravity of less than about 10°. In embodiments where the heavy cut includes hydrocarbons having a boiling point above about 490° C., the heavy cut may have an API gravity of less than 7°, for example. A heavy-cut having an API gravity of less than about 20°, for example, has been found to be convertible to steam cracker feeds using the more severe destructive hydrogenation conditions in the heavy-cut conditioning section of processes herein. Heavy-cuts for Arab light crudes processed according to embodiments herein may target an API gravity in the range from about 5° to about 10°, for example, and may target an API gravity in the range from about 100 to about 200 for Arab extra light crudes, for example.

Hydrogen Content

In some embodiments, the light cut may have a hydrogen content of greater than 12 wt %. In other embodiments, the light cut may have a hydrogen content of greater than 13 wt %. In yet other embodiments, the light cut may have a hydrogen content of greater than 13.5 wt %, greater than 14 wt %, or even greater than 15 wt %. In some embodiments, the mid cut may have a hydrogen content of greater than 11 wt % and less than 14 wt %, such as from a lower limit of 11, 11.5, 12.0, 12.5, or 13.0 wt % to an upper limit of 12.0, 12.5, 13.0, 13.5, 14.0, or 14.5 wt %. In some embodiments, the heavy cut may have a hydrogen content of less than 13 wt %, such as less than 12.5 wt %, less than 12 wt %, less than 11.5 wt %, or less than 11 wt %.

Accordingly, in some embodiments, a light cut, including hydrocarbons having a boiling point up to about 300° C., for example, may have an hydrogen content of greater than 13 wt %; in other embodiments, such as when the light cut includes hydrocarbons having a boiling point up to about 250° C., for example, the light cut may have an hydrogen content of greater than 13.5 wt %; in yet other embodiments, such as when the light cut includes hydrocarbons having a boiling point up to about 220° C., for example, the light cut may have an hydrogen content of greater than 14.0 wt %. In some embodiments where the light cut includes hydrocarbons having a boiling point below about 160° C., the light cut may have a hydrogen content of greater than 14.5 wt %. While the hydrogen content may vary for the different feeds at any given cut temperature, a hydrogen content, such as greater than 13 wt %, greater than 14 wt %, or greater than 14.5 wt %, for example, has been found to improve the processability of the light hydrocarbons in the steam pyrolysis unit without the need for intermediate processing. Light cuts for Arab light crudes processed according to embodiments herein may target a hydrogen content of greater than 14.5 wt %, for example, and may target a hydrogen content of greater than 14 wt % for Arab extra light crudes, for example.

In some embodiments, the mid cut, including hydrocarbons having a lower boiling point in the range from about 90° C. to about 300° C. and an upper boiling point in the range from about 400° C. to about 600° C., may have a hydrogen content of between about 11.5 wt % and 14.5 wt %. A mid-cut having a hydrogen content of between 12 wt % and 13.5 wt %, for example, has been found to be convertible to steam cracker feeds using relatively moderate destructive hydrogenation conditions in the mid-cut conditioning section of processes herein. Mid-cuts for Arab light crudes processed according to embodiments herein may target a hydrogen content in the range from about 12.5 wt % to about 13.5 wt %, for example, and may target an hydrogen content in the range from about 13.0 wt % to about 14.0 wt % for Arab extra light crudes, for example.

In various embodiments, the heavy cut, including hydrocarbons having a boiling point greater than about 300° C., may have a hydrogen content of less than about 13 wt %. When the heavy cut includes hydrocarbons having a boiling point above about 350° C., the heavy cut may have a hydrogen content of less than about 12.5 wt %. When the heavy cut includes hydrocarbons having a boiling point above about 400° C., the heavy cut may have a hydrogen content of less than about 12.0 wt %. In embodiments where the heavy cut includes hydrocarbons having a boiling point above about 490° C., the heavy cut may have a hydrogen content of less than 11 wt %, for example. A heavy-cut having a hydrogen content of less than about 12 wt %, for example, has been found to be convertible to steam cracker feeds using the more severe destructive hydrogenation conditions in the heavy-cut conditioning section of processes herein. Heavy-cuts for Arab light crudes processed according to embodiments herein may target a hydrogen content in the range from about 10 wt % to about 11 wt %, for example, and may target a hydrogen content in the range from about 11 wt % to about 12 wt % for Arab extra light crudes, for example.

Nitrogen Content

In some embodiments, the light cut may have a nitrogen content of less than 100 ppm, such as less than 50 ppm or less than 30 ppm. In other embodiments, the light cut may have a nitrogen content of less than 25 ppm. In yet other embodiments, the light cut may have a nitrogen content of less than 20 ppm, less than 15 ppm, less than 10 ppm, less than 5 ppm, less than 3 ppm, less than 1 ppm, or even less than 0.5 ppm. In some embodiments, the mid cut may have a nitrogen content of greater than 1 ppm and less than 1000 ppm, such as from a lower limit of 1, 5, 10, 50, 100, 250, or 500 ppm to an upper limit of 50, 100, 250, 500, or 1000 ppm. In some embodiments, the heavy cut may have a nitrogen content of greater than 10 ppm, such as greater than 25 ppm, greater than 50 ppm, greater than 100 ppm, greater than 150 ppm, greater than 200 ppm, greater than 250 ppm, greater than 500 ppm, greater than 1000 ppm, greater than 1500 ppm, greater than 2000 ppm, or greater than 2500 ppm.

Accordingly, in some embodiments, a light cut, including hydrocarbons having a boiling point up to about 300° C., for example, may have an nitrogen content of less than 0.01 wt %, or 100 ppm; in other embodiments, such as when the light cut includes hydrocarbons having a boiling point up to about 250° C., for example, the light cut may have an nitrogen content of less than 0.001 wt %, or 10 ppm; in yet other embodiments, such as when the light cut includes hydrocarbons having a boiling point up to about 220° C., for example, the light cut may have a nitrogen content of less than 0.0001 wt %, or 1 ppm. In some embodiments where the light cut includes hydrocarbons having a boiling point below about 160° C., the light cut may have a nitrogen content of less than about 0.00003 wt %, or 0.3 ppm. While the nitrogen content may vary for the different feeds at any given cut temperature, a nitrogen content, such as less than about 100 ppm, less than 10 ppm, or less than 1 ppm, for example, has been found to improve the convertibility of the light hydrocarbons in the steam pyrolysis unit without the need for intermediate processing. Light cuts for Arab light crudes processed according to embodiments herein may target a nitrogen content of less than 1 ppm, for example, and may also target a nitrogen content of less than 1 ppm for Arab extra light crudes, for example.

In some embodiments, the mid cut, including hydrocarbons having a lower boiling point in the range from about 90° C. to about 300° C. and an upper boiling point in the range from about 400° C. to about 600° C., may have a nitrogen content of between about 10 ppm and 250 ppm, for example. A mid-cut having a nitrogen content of between 20 and 250 ppm, for example, has been found to be convertible to steam cracker feeds using relatively moderate destructive hydrogenation conditions in the mid-cut conditioning section of processes herein. Mid-cuts for Arab light crudes processed according to embodiments herein may target a nitrogen content in the range from about 200 to about 300 ppm, for example, and may target an nitrogen content in the range from about 100 to about 150 ppm for Arab extra light crudes, for example.

In various embodiments, the heavy cut, including hydrocarbons having a boiling point greater than about 300° C., may have a nitrogen content of greater than about 0.001 wt %, or 10 ppm. When the heavy cut includes hydrocarbons having a boiling point above about 350° C., the heavy cut may have a nitrogen content of greater than about 0.005 wt %, or 50 ppm. When the heavy cut includes hydrocarbons having a boiling point above about 400° C., the heavy cut may have a nitrogen content of greater than about 0.01 wt %, or 100 ppm. In embodiments where the heavy cut includes hydrocarbons having a boiling point above about 490° C., the heavy cut may have a nitrogen content of greater than 2500 ppm, for example. A heavy-cut having a nitrogen content of greater than about 100 ppm, for example, has been found to be convertible to steam cracker feeds using the more severe destructive hydrogenation conditions in the heavy-cut conditioning section of processes herein. Heavy-cuts for Arab light crudes processed according to embodiments herein may target a nitrogen content in the range from about 2000 to about 3000 ppm, for example, and may target a nitrogen content in the range from about 1000 to about 2000 for Arab extra light crudes, for example.

Sulfur Content

In some embodiments, the light cut may have a sulfur content of less than 10000 ppm, such as less than 5000 ppm or less than 1000 ppm. In other embodiments, the light cut may have a sulfur content of less than 750 ppm. In yet other embodiments, the light cut may have a sulfur content of less than 500 ppm, less than 250 ppm, or even less than 100 ppm. In some embodiments, the mid cut may have a sulfur content of greater than 500 ppm and less than 10000 ppm, such as from a lower limit of 500, 750, 1000, 1500, 2000, 2500, or 5000 ppm to an upper limit of 1000, 2000, 5000, 10000, 15000, or 20000 ppm. In some embodiments, the heavy cut may have a sulfur content of greater than 1000 ppm, such as greater than 2500 ppm, greater than 5000 ppm, greater than 10000 ppm, greater than 15000 ppm, greater than 20000 ppm, greater than 25000 ppm, greater than 30000 ppm, greater than 35000 ppm, greater than 40000 ppm, greater than 45000 ppm, or greater than 50000 ppm.

Accordingly, in some embodiments, a light cut, including hydrocarbons having a boiling point up to about 300° C., for example, may have an sulfur content of 1 wt %, or 10,000 ppm; in other embodiments, such as when the light cut includes hydrocarbons having a boiling point up to about 250° C., for example, the light cut may have an sulfur content of less than 0.5 wt %, or 5,000 ppm; in yet other embodiments, such as when the light cut includes hydrocarbons having a boiling point up to about 220° C., for example, the light cut may have a sulfur content of less than 0.1 wt %, or 1,000 ppm. In some embodiments where the light cut includes hydrocarbons having a boiling point below about 160° C., the light cut may have a sulfur content of less than about 750 ppm or less than 500 ppm. While the sulfur content may vary for the different feeds at any given cut temperature, a sulfur content, such as less than about 600 ppm, for example, has been found to improve the convertibility of the light hydrocarbons in the steam pyrolysis unit without the need for intermediate processing. Light cuts for Arab light crudes processed according to embodiments herein may target a sulfur content of less than 750 ppm, for example, and may also target a sulfur content of less than 500 ppm for Arab extra light crudes, for example.

In some embodiments, the mid cut, including hydrocarbons having a lower boiling point in the range from about 90° C. to about 300° C. and an upper boiling point in the range from about 400° C. to about 600° C., may have a sulfur content of between about 1000 ppm and 20000 ppm, for example. A mid-cut having a sulfur content of between 2000 and 15000 ppm, for example, has been found to be convertible to steam cracker feeds using relatively moderate destructive hydrogenation conditions in the mid-cut conditioning section of processes herein. Mid-cuts for Arab light crudes processed according to embodiments herein may target a sulfur content in the range from about 6000 to about 12000 ppm, for example, and may target an sulfur content in the range from about 5000 to about 10000 ppm for Arab extra light crudes, for example.

In various embodiments, the heavy cut, including hydrocarbons having a boiling point greater than about 300° C., may have a sulfur content of greater than about 0.1 wt %, or 1,000 ppm. When the heavy cut includes hydrocarbons having a boiling point above about 350° C., the heavy cut may have a sulfur content of greater than about 0.5 wt %, or 5,000 ppm. When the heavy cut includes hydrocarbons having a boiling point above about 400° C., the heavy cut may have a sulfur content of greater than about 1 wt %, or 1,0000 ppm. In embodiments where the heavy cut includes hydrocarbons having a boiling point above about 490° C., the heavy cut may have a sulfur content of greater than 25000 ppm, for example. A heavy-cut having a sulfur content of greater than about 10000 ppm, for example, has been found to be convertible to steam cracker feeds using the more severe destructive hydrogenation conditions in the heavy-cut conditioning section of processes herein. Heavy-cuts for Arab light crudes processed according to embodiments herein may target a sulfur content in the range from about 30000 to about 50000 ppm, for example, and may target a sulfur content in the range from about 20000 to about 30000 for Arab extra light crudes, for example.

Viscosity

In some embodiments, the light cut may have a viscosity, measured at 40° C. according to ASTM D445, of less than 10 cSt. In other embodiments, the light cut may have a viscosity, measured at 40° C., of less than 5 cSt. In yet other embodiments, the light cut may have a viscosity, measured at 40° C., of less than 1 cSt. In some embodiments, the heavy cut may have a viscosity, measured at 100° C. according to ASTM D445, of greater than 10 cSt, such as greater than 20 cSt, greater than 35 cSt, greater than 50 cSt, greater than 75 cSt, or greater than 100 cSt. In various embodiments, the mid-cut may have a viscosity intermediate that of the light and heavy cuts.

Accordingly, in some embodiments, a light cut, including hydrocarbons having a boiling point up to about 300° C., for example, may have a viscosity, measured at 40° C., of less than 10 cSt; in other embodiments, such as when the light cut includes hydrocarbons having a boiling point up to about 250° C., for example, the light cut may have a viscosity, measured at 40° C., of less than 5 cSt; in yet other embodiments, such as when the light cut includes hydrocarbons having a boiling point up to about 220° C., for example, the light cut may have a viscosity, measured at 40° C., of less than 1 cSt. In some embodiments where the light cut includes hydrocarbons having a boiling point below about 160° C., the light cut may have a viscosity, measured at 40° C., of less than 0.75 cSt. While the viscosity may vary for the different feeds at any given cut temperature, a low viscosity, such as less than 10 cSt, for example, has been found to improve the processability of the light hydrocarbons in the steam pyrolysis unit without the need for intermediate processing. Light cuts for Arab light crudes processed according to embodiments herein may target a viscosity of less than 0.55 cSt, for example, and may target a viscosity of less than 0.6 cSt for Arab extra light crudes, for example.

In various embodiments, the heavy cut, including hydrocarbons having a boiling point greater than about 300° C., may have a viscosity, measured at 100° C., of greater than 10 cSt. When the heavy cut includes hydrocarbons having a boiling point above about 350° C., the heavy cut may have a viscosity, measured at 100° C., of greater than 50 cSt. When the heavy cut includes hydrocarbons having a boiling point above about 400° C., the heavy cut may have a viscosity, measured at 100° C., of greater than 100 cSt. In embodiments where the heavy cut includes hydrocarbons having a boiling point above about 490° C., the heavy cut may have a viscosity of greater than 375 cSt, for example. A heavy-cut having a viscosity of greater than about 40 cSt, for example, has been found to be convertible to steam cracker feeds using the more severe destructive hydrogenation conditions in the heavy-cut conditioning section of processes herein.

MCRT

In some embodiments, the light cut may have only trace amounts, or undetectable amounts, of microcarbon residue (MCRT). In some embodiments, the mid cut may have a MCRT of less than 5 wt %, such as less than 3 wt %, less than 1 wt %, or less than 0.5 wt %. In some embodiments, the heavy cut may have an MCRT of greater than 0.5 wt %, such as greater than 1 wt %, greater than 3 wt %, greater than 5 wt %, or greater than 10 wt %.

In some embodiments, the mid cut, including hydrocarbons having a lower boiling point in the range from about 90° C. to about 300° C. and an upper boiling point in the range from about 400° C. to about 600° C., may have a MCRT of between about 0 wt % (trace or unmeasurable) and 1 wt %. A mid-cut having negligible MCRT, for example, has been found to be convertible to steam cracker feeds using relatively moderate destructive hydrogenation conditions in the mid-cut conditioning section of processes herein.

In various embodiments, the heavy cut, including hydrocarbons having a boiling point greater than about 300° C., may have a MCRT of greater than 0.5 wt %. When the heavy cut includes hydrocarbons having a boiling point above about 350° C., the heavy cut may have a MCRT of greater than 1 wt %. When the heavy cut includes hydrocarbons having a boiling point above about 400° C., the heavy cut may have a MCRT of greater than 5 wt %. In embodiments where the heavy cut includes hydrocarbons having a boiling point above about 490° C., the heavy cut may have a MCRT of greater than 15 wt %, for example. A heavy-cut having a MCRT of greater than about 1 wt %, for example, has been found to be convertible to steam cracker feeds using the more severe destructive hydrogenation conditions in the heavy-cut conditioning section of processes herein.

Metals Content

In some embodiments, the light cut may have only trace amounts, or undetectable amounts, of metals. In some embodiments, the mid cut may have a metals content of up to 50 ppm, such as less than 30 ppm, less than 10 ppm, or less than 1 ppm. In some embodiments, the heavy cut may have a metals content of greater than 1 ppm, such as greater than 10 ppm, greater than 20 ppm, greater than 35 ppm, or greater than 50 ppm.

In some embodiments, the mid cut, including hydrocarbons having a lower boiling point in the range from about 90° C. to about 300° C. and an upper boiling point in the range from about 400° C. to about 600° C., may have a metals content of between about 0 ppm (trace or unmeasurable) and 5 ppm, such as from greater than 0 ppm to 1 ppm. A mid-cut having negligible metals content, for example, has been found to be convertible to steam cracker feeds using relatively moderate destructive hydrogenation conditions in the mid-cut conditioning section of processes herein.

In various embodiments, the heavy cut, including hydrocarbons having a boiling point greater than about 300° C., may have a metals content of greater than 1 ppm. When the heavy cut includes hydrocarbons having a boiling point above about 350° C., the heavy cut may have a metals content of greater than 10 ppm. When the heavy cut includes hydrocarbons having a boiling point above about 400° C., the heavy cut may have a metals content of greater than 50 ppm. In embodiments where the heavy cut includes hydrocarbons having a boiling point above about 490° C., the heavy cut may have a metals content of greater than 75 ppm, for example. A heavy-cut having a metals content of greater than about 10 ppm, for example, has been found to be convertible to steam cracker feeds using the more severe destructive hydrogenation conditions in the heavy-cut conditioning section of processes herein.

As an example, an Arab Light crude oil stream may be separated in the initial separation step in order to produce the desired light-, mid-, and heavy-cuts. Without intending to be bound by theory, the light-cut may be a 160° C.– fraction with 5% of the fraction having a boiling point below 36° C. and 95% of the fraction having a boiling point below 160° C. (only 5% of the fraction would have a boiling point above 160° C.). The light cut may have an API gravity of about 65.5°, may have a BMCI of about 5.2, may have a hydrogen content of about 14.8 wt % (or 148,000 ppm), may have a nitrogen content of less than 0.00003 wt % (or 0.3 ppm), may have a sulfur content of about 0.0582 wt % (or 582 ppm), may have a viscosity, at 40° C., of about 0.5353 centistokes (cSt), and may have only trace amounts of MCRT and total metals content. The mid-cut may be a 160° C. to 490° C. fraction with 5% of the fraction having a boiling point below 173° C. and 95% of the fraction having a boiling point below 474° C. (only 5% of the fraction would have a boiling point above 474° C.). The mid-cut may have an API gravity of about 33.6°, may have a BMCI of about 25, may have a hydrogen content of about 12.83 wt % (or 128,300 ppm), may have a nitrogen content of less than 0.0227 wt % (or 227 ppm), may have a sulfur content of about 0.937 wt % (or 9,370 ppm), may have a viscosity, at 100° C., of about 1.58 centistokes (cSt), may have an MCRT of 0.03 wt %, and may have only trace amounts of total metals content. The heavy-cut may be a 490° C.+ fraction with 5% of the fraction having a boiling point below 490° C. and 95% of the fraction having a boiling point below 735° C. (only 5% of the fraction would have a boiling point above 735° C.). The heavy-cut may have an API gravity of about 8.2°, may have a BMCI of about 55, may have a hydrogen content of about 10.41 wt % (or 104,100 ppm), may have a nitrogen content of less than 0.2638 wt % (or 2,368 ppm), may have a sulfur content of about 3.9668 wt % (or 39,668 ppm), may have a viscosity, at 100° C., of about 394.3 centistokes (cSt), may have an MCRT of 17.22 wt %, and may have a total metals content 79.04 ppm.

As another example, an Arab Extra Light crude oil stream may be separated in the initial separation step in order to produce the desired light-, mid-, and heavy-cuts. Without intending to be bound by theory, the light-cut may be a 160° C.– fraction with 5% of the fraction having a boiling point below 54° C. and 95% of the fraction having a boiling point below 160° C. (only 5% of the fraction would have a boiling point above 160° C.). The light cut may have an API gravity of about 62°, may have a BMCI of about 9.09, may have a hydrogen content of about 14.53 wt % (or 145,300 ppm), may have a nitrogen content of less than 0.00003 wt % (or 0.3 ppm), may have a sulfur content of about 0.0472 wt % (or 472 ppm), may have a viscosity, at 40° C., of about 0.58 centistokes (cSt), and may have only trace amounts of MCRT and total metals content. The mid-cut may be a 160° C. to 490° C. fraction with 5% of the fraction having a boiling point below 169° C. and 95% of the fraction having a boiling point below 456° C. (only 5% of the fraction would have a boiling point above 474° C.). The mid-cut may have an API gravity of about 36.1°, may have a BMCI of about 21.22, may have a hydrogen content of about 13.38 wt % (or 133,800 ppm), may have a nitrogen content of less than 0.01322 wt % (or 132.2 ppm), may have a sulfur content of about 0.9047 wt % (or 9,047 ppm), may have a viscosity, at 100° C., of about 1.39 centistokes (cSt), and may have only trace amounts of MCRT and total metals content. The heavy-cut may be a 490° C.+ fraction with 5% of the fraction having a boiling point below 455° C. and 95% of the fraction having a boiling point below 735° C. (only 5% of the fraction would have a boiling point above 735° C.). The heavy-cut may have an API gravity of about 15.1°, may have a BMCI of about 33.28, may have a hydrogen content of about 11.45 wt % (or 114,500 ppm), may have a nitrogen content of less than 0.1599 wt % (or 1,599 ppm), may have a sulfur content of about 2.683 wt % (or 26,830 ppm), may have a viscosity, at 100° C., of about 48.79 centistokes (cSt), may have an MCRT of 9.53 wt %, and may have a total metals content 58.45 ppm.

While various properties have been described with respect to Arab Light and Arab Extra Light, the aforementioned would also be applicable to other types of crude, such as desalted oils, condensate, biogenic oil, synthesis crude, tight oil, heavy hydrocarbons, reconstituted crudes, and bitumen derived oils.

Embodiments herein contemplate adjustment of the various cut points and reactor conditions based upon one or more of the above-noted properties. Methods according to embodiments herein may assay the petroleum feeds to be used, measuring one or more of the various properties of an incoming feed. Based on one or more of the properties, cut points, catalyst types (for moving bed reactors), pressures, temperatures, space velocity, hydrogen feed rates, and other variables may be adjusted to more effectively and efficiently utilize the reactor configuration, so as to maintain prime, near optimal, or optimal conditioning of the feedstock and the various cuts to desirable steam cracker feedstocks.

For example, the ebullated bed which receives the heavy-cut may have a capacity to process an amount of hydrocarbon having a sulfur content of less than 40,000 ppm. If a particular 490° C.+ heavy-cut would have a sulfur content of greater than 40,000 ppm, the capacity of the ebullated bed may be reduced. Accordingly, the heavy-cut point may be reduced, to 465° C.+, for example, in order have the sulfur content be less than 40,000 ppm. Further, if a particular 160° C.-490° C. mid-cut fraction has a hydrogen content of greater than 14 wt %, for example, and the nitrogen, sulfur, MCRT, and total metals is suitably low, the light-cut fraction may be expanded (from 160° C.– to 190° C.–, for example) to route more of the whole crude directly to the steam cracker. Alternatively, if the mid-cut is lower in hydrogen, for example, and/or the sulfur, nitrogen, MCRT, and/or total metals are not suitably low, the light-cut may be reduced (from 160° C.– to 130° C.–, for example), such that additional mid-cut may be processed in the fixed bed conditioning stages.

Processes herein provide the needed flexibility to maintain a high conversion of various feedstocks to petrochemicals. One skilled in the art, knowing that the types of hydrocarbon components, sulfur content, nitrogen content, etc., may vary widely amongst the various feed types (an Arab extra light crude is much different than a West Texas Intermediate crude), and feeds from various resources may be processed in any given day, week, month, or year, at a given plant, will recognize the benefits of the processes herein to flexibly produce petrochemicals from many different feedstocks.

As described above, embodiments herein may be used to convert a whole crude, including the heavier fractions of crude oil, into high-value petrochemicals and may minimize the amount sent to a fuel oil pool, which increases profitability. The fuel oil pool may also be upgraded into a low-sulfur, IMO 2020 compliant fuel oil, further increasing the value of the products.

Embodiments herein may initially split the wide boiling range hydrocarbon feedstock into light, mid, and heavy cuts. The division of feedstocks into the various cuts may allow advantageous processing conditions, reactor sizing, and other factors not achievable in flow schemes that teach one skilled in the art to hydrotreat or otherwise condition the entirety of a whole crude or even a heavy portion thereof, such as a single 200°+ cut. The ability to prepare steam cracker feeds from separate mid cuts and heavy cuts at reaction conditions more suitable for hydrocarbons in those respective fractions advantageously provides for enhanced production of petrochemicals, as described herein, and provides for one or more of the following advantages: extended catalyst life for conditioning the mid-cut; economical reactor sizing for each of the respective cuts; matched run times of the mid-cut conditioning and the steam cracker; the ability to condition the respective fractions at preferred conditions; the ability to tailor the catalyst for preferred conditioning of the respective fractions; and other advantages as may readily be envisioned by one skilled in the art based on the disclosure herein.

As described above, embodiments herein may relate to one or more of the following embodiments:

Embodiment 1: A process for converting whole crudes and other wide boiling hydrocarbon streams to produce olefins and/or aromatics, the process comprising:
- separating a whole crude into at least a light boiling fraction, a medium boiling fraction, and a high boiling residue fraction;
- hydrocracking the high boiling residue fraction to form a hydrocracked effluent, and separating the hydrocracked effluent to produce a resid hydrocracked fraction and a fuel oil fraction;
- destructively hydrogenating and hydrocracking the medium boiling fraction and the resid hydrocracked fraction to produce a hydrotreated and hydrocracked effluent;
- feeding the hydrotreated and hydrocracked effluent and the light boiling fraction to at least one of a steam cracker and an aromatics complex to convert hydrocarbons therein into petrochemicals and a pyrolysis oil and/or an ultra-low sulfur fuel oil (ULSFO).

Embodiment 2: The process of embodiment 1, wherein the light boiling fraction has two or more of the following properties:
- a 95% boiling point temperature in the range from about 130° C. to about 200° C.;
- a hydrogen content of at least 14 wt %;
- a BMCI of less than 5;
- an API gravity of greater than 40°;
- a sulfur content of less than 1000 ppm;
- a nitrogen content of less than 10 ppm;
- a viscosity, measured at 40° C., of less than 1 cSt;
- less than 1 wt % MCRT; and
- less than 1 ppm total metals.

Embodiment 3: The process of embodiment 1 or embodiment 2, wherein the medium boiling fraction has two or more of the following properties:
- a 5% boiling point temperature in the range from about 130° C. to about 200° C.;
- a 95% boiling point temperature in the range from about 400° C. to about 600° C.;
- a hydrogen content in the range from about 12 wt % to about 14 wt %;
- a BMCI in the range from about 5 to less than 50;
- an API gravity of in the range from about 100 to about 40°;
- a sulfur content in the range from about 1000 ppm to about 10000 ppm;
- a nitrogen content in the range from about 1 ppm to about 100 ppm;
- a viscosity, measured at 40° C., of greater than 1 cSt;
- less than 5 wt % MCRT; and
- less than 50 ppm total metals.

Embodiment 4: The process of any one of embodiment 1-3, wherein the heavy boiling fraction has two or more of the following properties:
- a 5% boiling point temperature in the range from about 400° C. to about 600° C.;
- a hydrogen content of less than 12 wt %;
- a BMCI of greater than 50;
- an API gravity of less than 10°;
- a sulfur content of greater than 10000 ppm;
- a nitrogen content of greater than 100 ppm;
- a viscosity, measured at 100° C., of greater than 100 cSt;
- greater than 5 wt % MCRT; and
- greater than 50 ppm total metals.

Embodiment 5: The process of any one of embodiments 1-4, wherein:
- the resid hydrocracked fraction has a 95% boiling point temperature in the range from about 400° C. to about 560° C.

Embodiment 6: The process of any one of embodiments 1-5, wherein the high boiling residue fraction has a 5% boiling point temperature of greater than about 545° C.

Embodiment 7: The process of any one of embodiments 1-6, wherein the hydrocracking the high boiling residue fraction comprises contacting the high boiling residue fraction and the pyrolysis oil with an extrudate or slurry catalyst at conditions sufficient to convert at least a portion of the high boiling residue fraction hydrocarbons to lighter hydrocarbons.

Embodiment 8: The process of any one of embodiments 1-7, wherein hydrocracking the high boiling residue fraction comprises converting in excess of 70% of the hydrocarbons having a boiling point of greater than 565° C.

Embodiment 9: The process of any one of embodiments 1-8, wherein the destructively hydrogenating and hydrocracking the medium boiling fraction and the resid hydrocracked fraction comprises destructive hydrogenation the medium boiling fraction and the resid hydrocracked fraction in a common destructive hydrogenation unit, and hydrocracking an effluent from the common destructive hydrogenation unit in a hydrocracking unit.

Embodiment 10: The process of any one of embodiments 1-9, wherein the destructively hydrogenating and hydrocracking the medium boiling fraction and the resid hydrocracked fraction comprises:
- destructively hydrogenating the medium boiling fraction in a first destructive hydrogenation unit;
- destructively hydrogenating the resid hydrocracked fraction in a second destructive hydrogenation unit; and
- combining the effluents from the first and second destructive hydrogenation units and hydrocracking the combined effluents in a hydrocracking unit.

Embodiment 11: The process of embodiment 10, further comprising destructive hydrogenating the resid hydrocracked fraction in the first destructive hydrogenation unit during a time period when catalyst is being replaced in the second destructive hydrogenation unit.

Embodiment 12: The process of any one of embodiments 1-11, further comprising hydrodesulfurizing the fuel oil fraction to produce an ultra-low sulfur fuel oil.

Embodiment 13: The process of any one of embodiments 1-12, wherein an overall petrochemicals production is at least 65 wt %, based on a total amount of olefins and aromatics produced as compared to a total feedstock feed rate, inclusive of the whole crude and any additional feeds.

Embodiment 14: The process of any one of embodiments 1-13, wherein feeding the hydrotreated and hydrocracked effluent and the light boiling fraction to at least one of a steam cracker and an aromatics complex comprises:
- separating the hydrotreated and hydrocracked effluent and the light boiling fraction to a separator to produce a light naphtha fraction and a heavy naphtha fraction;
- feeding the light naphtha fraction to the steam cracker unit; and
- feeding the heavy naphtha fraction to the aromatics complex.

Embodiment 15: The process of any one of embodiments 1-14, comprising feeding the hydrotreated and hydrocracked effluent and the light boiling fraction directly to the steam cracker.

Embodiment 16: A process for converting whole crudes and other wide boiling hydrocarbon streams to produce olefins and/or aromatics, the process comprising:

separating a whole crude into at least a light boiling fraction, a medium boiling fraction, and a high boiling residue fraction;

hydrocracking the high boiling residue fraction to form a hydrocracked effluent, and separating the hydrocracked effluent to produce a resid hydrocracked fraction and a fuel oil fraction;

destructively hydrogenating the medium boiling fraction to form a first destructively hydrogenated effluent;

destructively hydrogenating the resid hydrocracked fraction to produce a second destructively hydrogenated effluent mixing the first and second destructively hydrogenated effluents to form a mixture and hydrocracking the mixture to produce a hydrotreated and hydrocracked effluent;

feeding the hydrotreated and hydrocracked effluent and the light boiling fraction to at least one of a steam cracker and an aromatics complex to convert hydrocarbons therein into petrochemicals and a pyrolysis oil and/or an ultra-low sulfur fuel oil (ULSFO).

Embodiment 17: A process for converting whole crudes and other wide boiling hydrocarbon streams to produce olefins and/or aromatics, the process comprising:

separating a whole crude into at least a light boiling fraction, a medium boiling fraction, and a high boiling residue fraction;

hydrocracking the high boiling residue fraction to form a hydrocracked effluent, and separating the hydrocracked effluent to produce a resid hydrocracked fraction and a fuel oil fraction;

destructively hydrogenating the medium boiling fraction to form a first destructively hydrogenated effluent;

destructively hydrogenating the resid hydrocracked fraction to produce a second destructively hydrogenated effluent mixing the first and second destructively hydrogenated effluents to form a mixture and hydrocracking the mixture to form produce a hydrotreated and hydrocracked effluent;

feeding the hydrotreated and hydrocracked effluent and the light boiling fraction to at least one of a steam cracker and an aromatics complex to convert hydrocarbons therein into petrochemicals and a pyrolysis oil and/or an ultra-low sulfur fuel oil (ULSFO).

Embodiment 18: The process of embodiment 17, wherein the light boiling fraction has two or more of the following properties:

a 95% boiling point temperature in the range from about 130° C. to about 200° C.;
a hydrogen content of at least 14 wt %;
a BMCI of less than 5;
an API gravity of greater than 40°;
a sulfur content of less than 1000 ppm;
a nitrogen content of less than 10 ppm;
a viscosity, measured at 40° C., of less than 1 cSt;
less than 1 wt % MCRT; and
less than 1 ppm total metals.

Embodiment 19: The process of embodiment 17 or embodiment 18, wherein the medium boiling fraction has two or more of the following properties:

a 5% boiling point temperature in the range from about 130° C. to about 200° C.;
a 95% boiling point temperature in the range from about 400° C. to about 600° C.;
a hydrogen content in the range from about 12 wt % to about 14 wt %;
a BMCI in the range from about 5 to less than 50;
an API gravity of in the range from about 100 to about 40°;
a sulfur content in the range from about 1000 ppm to about 10000 ppm;
a nitrogen content in the range from about 1 ppm to about 100 ppm;
a viscosity, measured at 40° C., of greater than 1 cSt;
less than 5 wt % MCRT; and
less than 50 ppm total metals.

Embodiment 20: The process of any one of embodiment 17-19, wherein the heavy boiling fraction has two or more of the following properties:

a 5% boiling point temperature in the range from about 400° C. to about 600° C.;
a hydrogen content of less than 12 wt %;
a BMCI of greater than 50;
an API gravity of less than 10°;
a sulfur content of greater than 10000 ppm;
a nitrogen content of greater than 100 ppm;
a viscosity, measured at 100° C., of greater than 100 cSt;
greater than 5 wt % MCRT; and
greater than 50 ppm total metals.

Embodiment 21: The process of any one of embodiments 17-20, wherein:

the resid hydrocracked fraction has a 95% boiling point temperature in the range from about 400° C. to about 560° C.

Embodiment 22: The process of any one of embodiments 17-21, wherein the high boiling residue fraction has a 5% boiling point temperature of greater than about 545° C.

Embodiment 23: The process of any one of embodiments 17-22, wherein the hydrocracking the high boiling residue fraction comprises contacting the high boiling residue fraction and the pyrolysis oil with an extrudate or slurry catalyst at conditions sufficient to convert at least a portion of the high boiling residue fraction hydrocarbons to lighter hydrocarbons.

Embodiment 24: The process of any one of embodiments 17-23, wherein hydrocracking the high boiling residue fraction comprises converting in excess of 70% of the hydrocarbons having a boiling point of greater than 565° C.

Embodiment 25: The process of any one of embodiments 17-24, wherein the destructively hydrogenating the medium boiling fraction and the destructively hydrogenating the resid hydrocracked fraction comprises destructive hydrogenating the medium boiling fraction and the resid hydrocracked fraction in a common destructive hydrogenation unit.

Embodiment 26: The process of any one of embodiments 17-25, wherein the destructively hydrogenating the medium boiling fraction and the destructively hydrogenating the resid hydrocracked fraction comprises:

destructively hydrogenating the medium boiling fraction in a first destructive hydrogenation unit;
destructively hydrogenating the resid hydrocracked fraction in a second destructive hydrogenation unit; and
combining the effluents from the first and second destructive hydrogenation units.

Embodiment 27: The process of embodiment 26, further comprising destructive hydrogenating the resid hydrocracked fraction in the first destructive hydrogenation unit during a time period when catalyst is being replaced in the second destructive hydrogenation unit.

Embodiment 28: The process of any one of embodiments 17-27, further comprising hydrodesulfurizing the fuel oil fraction to produce an ultra-low sulfur fuel oil.

Embodiment 29: The process of any one of embodiments 17-28, wherein an overall petrochemicals production is at least 65 wt %, based on a total amount of olefins and aromatics produced as compared to a total feedstock feed rate, inclusive of the whole crude and any additional feeds.

Embodiment 30: The process of any one of embodiments 17-29, wherein feeding the hydrotreated and hydrocracked effluent and the light boiling fraction to at least one of a steam cracker and an aromatics complex comprises:
  separating the hydrotreated and hydrocracked effluent and the light boiling fraction to a separator to produce a light naphtha fraction and a heavy naphtha fraction;
  feeding the light naphtha fraction to the steam cracker unit; and
  feeding the heavy naphtha fraction to the aromatics complex.

Embodiment 31: The process of any one of embodiments 17-30, comprising feeding the hydrotreated and hydrocracked effluent and the light boiling fraction directly to the steam cracker.

Embodiment 32: A process for converting whole crudes and other wide boiling hydrocarbon streams to produce olefins and/or aromatics, the process comprising:
  separating a whole crude into at least a first fraction, a second fraction, and a third fraction, wherein:
    the first fraction has a BMCI of less than 20 and a hydrogen content of greater than 13 wt %;
    the third fraction has a BMCI of greater than 30 and a hydrogen content of less than 13 wt %;
    and the second fraction has a BMCI and a hydrogen content intermediate the respective values for the first and third fractions;
  hydrocracking the third fraction to form a hydrocracked effluent, and separating the hydrocracked effluent to produce a resid hydrocracked fraction and a fuel oil fraction;
  destructively hydrogenating and hydrocracking the second fraction and the resid hydrocracked fraction to produce a hydrotreated and hydrocracked effluent;
  feeding the hydrotreated and hydrocracked effluent and the first fraction to at least one of a steam cracker and an aromatics complex to convert hydrocarbons therein into petrochemicals and a pyrolysis oil and/or an ultra-low sulfur fuel oil (ULSFO).

Embodiment 33: A process for converting whole crudes and other wide boiling hydrocarbon streams to produce olefins and/or aromatics, the process comprising:
  separating a whole crude into at least a light boiling fraction, a medium boiling fraction, and a high boiling residue fraction;
  hydrocracking the high boiling residue fraction and a heavy fraction to form a hydrocracked effluent, and separating the hydrocracked effluent to produce a resid hydrocracked fraction and a fuel oil fraction;
  destructively hydrogenating and hydrocracking the medium boiling fraction and the resid hydrocracked fraction to produce a hydrotreated and hydrocracked effluent;
  separating the hydrotreated and hydrocracked effluent to produce a light fraction and the heavy fraction;
  feeding the light fraction and the light boiling fraction to a separator to recover a light naphtha fraction and a heavy naphtha fraction;
  feeding the light naphtha fraction to a steam cracker to convert the light naphtha fraction into petrochemicals including ethylene, propylene, and butenes; and
  feeding the heavy naphtha fraction to an aromatics complex to convert hydrocarbons therein into petrochemicals including benzene, toluene, and xylenes.

Embodiment 34: The process of embodiment 33, further comprising mixing a slurry oil with the high boiling residue fraction prior to hydrocracking the high boiling residue fraction.

Embodiment 35: The process of embodiment 33 or 34, further comprising mixing a light cycle oil with the medium boiling fraction prior to the destructively hydrogenating and hydrocracking the medium boiling fraction.

Embodiment 36: A process for converting whole crudes and other wide boiling hydrocarbon streams to produce olefins and/or aromatics, the process comprising:
  separating a whole crude in a first separation device into a light boiling fraction and a remainder fraction;
  separating the reminder fraction in a second separation device into a medium boiling fraction and a high boiling residue fraction;
  hydrocracking the high boiling residue fraction to form a hydrocracked effluent;
  separating the hydrocracked effluent to produce a first converted fraction and a first heavy fraction;
  hydrocracking the first heavy fraction to form a second hydrocracked effluent;
  separating the second hydrocracked effluent to produce a resid hydrocracked fraction and a fuel oil fraction;
  destructively hydrogenating the medium boiling fraction, the first converted fraction, and the resid hydrocracked fraction to produce a hydrotreated effluent;
  separating the hydrotreated effluent to produce a lights fraction comprising hydrogen and hydrogen sulfide, a sour water stream, and a hydrotreated fraction;
  hydrocracking the hydrotreated fraction and a pyrolysis oil fraction to produce a second hydrocracked effluent;
  separating the second hydrocracked effluent to recover a lights fraction comprising hydrogen and a hydrocracked fraction;
  feeding the light fraction and the hydrocracked fraction to a separator to recover a light naphtha fraction and a heavy naphtha fraction;
  feeding the light naphtha fraction to a steam cracker to convert the light naphtha fraction into petrochemicals including ethylene, propylene, and butenes; and
  feeding the heavy naphtha fraction to an aromatics complex to convert hydrocarbons therein into petrochemicals including benzene, toluene, and xylenes.

Embodiment 37: The embodiments of any one of embodiments 1-36, wherein the light boiling fraction or the first fraction, appropriately, has two or more of the following properties:
  a 95% boiling point temperature in the range from about 90° C. to about 300° C.;
  a hydrogen content of at least 13 wt %;
  a BMCI of less than 20;
  an API gravity of greater than 10°;
  a sulfur content of less than 1 wt %;
  a nitrogen content of less than 100 ppm;
  a viscosity, measured at 40° C., of less than 10 cSt;
  less than 1 wt % MCRT; and
  less than 1 ppm total metals.

Embodiment 38, The embodiments of any one of embodiments 1-36, wherein the light boiling fraction or the first fraction, appropriately, has two or more of the following properties:
  a 95% boiling point temperature in the range from about 110° C. to about 250° C.;

a hydrogen content of at least 13.5 wt %;
a BMCI of less than 10;
an API gravity of greater than 20°;
a sulfur content of less than 5000 ppm;
a nitrogen content of less than 10 ppm;
a viscosity, measured at 40° C., of less than 5 cSt;
less than 1 wt % MCRT; and
less than 1 ppm total metals.

Embodiment 39: The embodiments of any one of embodiments 1-36, wherein the light boiling fraction or the first fraction, appropriately, has two or more of the following properties:
- a 95% boiling point temperature in the range from about 130° C. to about 200° C.;
- a hydrogen content of at least 14 wt %;
- a BMCI of less than 5;
- an API gravity of greater than 40°;
- a sulfur content of less than 1000 ppm;
- a nitrogen content of less than 1 ppm;
- a viscosity, measured at 40° C., of less than 1 cSt;
- less than 1 wt % MCRT; and
- less than 1 ppm total metals.

Embodiment 40: The embodiments of any one of embodiments 1-36, wherein the medium boiling fraction or the second fraction, appropriately, has two or more of the following properties:
- a 5% boiling point temperature in the range from about 130° C. to about 200° C.;
- a 95% boiling point temperature in the range from about 400° C. to about 600° C.;
- a hydrogen content in the range from about 12 wt % to about 14 wt %;
- a BMCI in the range from about 5 to less than 50;
- an API gravity of in the range from about 100 to about 40°;
- a sulfur content in the range from about 1000 ppm to about 10000 ppm;
- a nitrogen content in the range from about 1 ppm to about 100 ppm;
- a viscosity, measured at 40° C., of greater than 1 cSt;
- less than 5 wt % MCRT; and
- less than 50 ppm total metals.

Embodiment 41: The embodiments of any one of embodiments 1-36, wherein the medium boiling fraction or the second fraction, appropriately, has two or more of the following properties:
- a 5% boiling point temperature in the range from about 110° C. to about 250° C.;
- a 95% boiling point temperature in the range from about 350° C. to about 650° C.;
- a hydrogen content in the range from about 12 wt % to about 14 wt %;
- a BMCI in the range from about 5 to less than 50;
- an API gravity of in the range from about 100 to about 40°;
- a sulfur content in the range from about 1000 ppm to about 10000 ppm;
- a nitrogen content in the range from about 1 ppm to about 100 ppm;
- a viscosity, measured at 40° C., of greater than 1 cSt;
- less than 5 wt % MCRT; and
- less than 50 ppm total metals.

Embodiment 42: The embodiments of any one of embodiments 1-36, wherein the medium boiling fraction or the second fraction, appropriately, has two or more of the following properties:
- a 5% boiling point temperature in the range from about 90° C. to about 300° C.;
- a 95% boiling point temperature in the range from about 300° C. to about 700° C.;
- a hydrogen content in the range from about 12 wt % to about 14 wt %;
- a BMCI in the range from about 5 to less than 50;
- an API gravity of in the range from about 100 to about 40°;
- a sulfur content in the range from about 1000 ppm to about 10000 ppm;
- a nitrogen content in the range from about 1 ppm to about 100 ppm;
- a viscosity, measured at 40° C., of greater than 1 cSt;
- less than 5 wt % MCRT; and
- less than 50 ppm total metals.

Embodiment 43: The embodiments of any one of embodiments 1-36, wherein the heavy boiling fraction or the third fraction, appropriately, has two or more of the following properties:
- a 5% boiling point temperature in the range from about 300° C. to about 700° C.;
- a hydrogen content of less than 13 wt %;
- a BMCI of greater than 30;
- an API gravity of less than 40°;
- a sulfur content of greater than 1000 ppm;
- a nitrogen content of greater than 10 ppm;
- a viscosity, measured at 100° C., of greater than 10 cSt;
- greater than 0.5 wt % MCRT; and
- greater than 1 ppm total metals.

Embodiment 44: The embodiments of any one of embodiments 1-36, wherein the heavy boiling fraction or the third fraction, appropriately, has two or more of the following properties:
- a 5% boiling point temperature in the range from about 350° C. to about 650° C.;
- a hydrogen content of less than 12.5 wt %;
- a BMCI of greater than 40;
- an API gravity of less than 20°;
- a sulfur content of greater than 5000 ppm;
- a nitrogen content of greater than 50 ppm;
- a viscosity, measured at 100° C., of greater than 50 cSt;
- greater than 1 wt % MCRT; and
- greater than 10 ppm total metals.

Embodiment 45: The embodiments of any one of embodiments 1-36, wherein the heavy boiling fraction or the third fraction, appropriately, has two or more of the following properties:
- a 5% boiling point temperature in the range from about 400° C. to about 600° C.;
- a hydrogen content of less than 12 wt %;
- a BMCI of greater than 50;
- an API gravity of less than 10°;
- a sulfur content of greater than 10000 ppm;
- a nitrogen content of greater than 100 ppm;
- a viscosity, measured at 100° C., of greater than 100 cSt;
- greater than 5 wt % MCRT; and
- greater than 50 ppm total metals.

Embodiment 46: A system for converting whole crudes and other wide boiling hydrocarbon streams to produce olefins and/or aromatics, the system comprising:
- a separation system for separating a whole crude into at least a light boiling fraction, a medium boiling fraction, and a high boiling residue fraction;
- a hydrocracking reaction zone for hydrocracking the high boiling residue fraction to form a hydrocracked effluent, and a separation system for separating the hydrocracked effluent to produce a resid hydrocracked fraction and a fuel oil fraction;
a reaction zone for destructively hydrogenating and hydrocracking the medium boiling fraction and the resid hydrocracked fraction to produce a hydrotreated and hydrocracked effluent;
a steam cracker and optionally an aromatics complex for converting the hydrotreated and hydrocracked effluent and the light boiling fraction into petrochemicals and a pyrolysis oil and/or an ultra-low sulfur fuel oil (ULSFO).

Embodiment 47: The system of embodiment 46, wherein the hydrocracking reaction zone for hydrocracking the high boiling residue fraction comprises a slurry reactor or an ebullated bed reactor.

Embodiment 48: The system of any one of embodiments 46-47, wherein the reaction zone for destructively hydrogenating and hydrocracking the medium boiling fraction and the resid hydrocracked fraction comprises a common destructive hydrogenation unit for destructively hydrogenating the medium boiling fraction and the resid hydrocracked fraction, and a hydrocracking reactor for hydrocracking an effluent from the common destructive hydrogenation unit.

Embodiment 49: The system of any one of embodiments 46-48, wherein the reaction zone for destructively hydrogenating and hydrocracking the medium boiling fraction and the resid hydrocracked fraction comprises:
a first destructive hydrogenation unit for destructively hydrogenating the medium boiling fraction;
a second destructive hydrogenation unit for destructively hydrogenating the resid hydrocracked fraction; and
a mixer for combining the effluents from the first and second destructive hydrogenation units.

Embodiment 50: The system of embodiment 49, further comprising a flow diverter for diverting the resid hydrocracked fraction to the first destructive hydrogenation unit during a time period when catalyst is being replaced in the second destructive hydrogenation unit.

Embodiment 51: The system of any one of embodiments 46-50, further comprising a reactor for hydrodesulfurizing the fuel oil fraction to produce an ultra-low sulfur fuel oil.

Embodiment 52: The system of any one of embodiments 46-51, further comprising:
a separator for separating the hydrotreated and hydrocracked effluent and the light boiling fraction to produce a light naphtha fraction and a heavy naphtha fraction;
a flow line for feeding the light naphtha fraction to the steam cracker unit; and
a flow line for feeding the heavy naphtha fraction to the aromatics complex.

Embodiment 53: A system for converting whole crudes and other wide boiling hydrocarbon streams to produce olefins and/or aromatics, the process comprising:
a separation system for separating a whole crude into at least a light boiling fraction, a medium boiling fraction, and a high boiling residue fraction;
a hydrocracker for hydrocracking the high boiling residue fraction to form a hydrocracked effluent, and a separator for separating the hydrocracked effluent to produce a resid hydrocracked fraction and a fuel oil fraction;
a first conditioning unit for destructively hydrogenating the medium boiling fraction to form a first destructively hydrogenated effluent;
a second conditioning unit for destructively hydrogenating the resid hydrocracked fraction to produce a second destructively hydrogenated effluent;
a mixer for mixing the first and second destructively hydrogenated effluents to form a mixture and a hydrocracker for hydrocracking the mixture to produce a hydrotreated and hydrocracked effluent;
a flow line for feeding the hydrotreated and hydrocracked effluent and the light boiling fraction to at least one of a steam cracker and an aromatics complex to convert hydrocarbons therein into petrochemicals and a pyrolysis oil and/or an ultra-low sulfur fuel oil (ULSFO).

Embodiment 54: A system for converting whole crudes and other wide boiling hydrocarbon streams to produce olefins and/or aromatics, the system comprising:
a separation system for separating a whole crude into at least a light boiling fraction, a medium boiling fraction, and a high boiling residue fraction;
a hydrocracker for hydrocracking the high boiling residue fraction to form a hydrocracked effluent, and separating the hydrocracked effluent to produce a resid hydrocracked fraction and a fuel oil fraction;
a first conditioning reactor for destructively hydrogenating the medium boiling fraction to form a first destructively hydrogenated effluent;
a second conditioning reactor for destructively hydrogenating the resid hydrocracked fraction to produce a second destructively hydrogenated effluent;
a mixer for mixing the first and second destructively hydrogenated effluents to form a mixture and a hydrocracker for hydrocracking the mixture to form produce a hydrotreated and hydrocracked effluent;
one or more flow lines for feeding the hydrotreated and hydrocracked effluent and the light boiling fraction to at least one of a steam cracker and an aromatics complex to convert hydrocarbons therein into petrochemicals and a pyrolysis oil and/or an ultra-low sulfur fuel oil (ULSFO).

Embodiment 55: The system of embodiment 54, wherein the hydrocracker for hydrocracking the high boiling residue fraction comprises a slurry reactor or an ebullated bed reactor.

Embodiment 56: The system of embodiment 55, further comprising a flow line for diverting the resid hydrocracked fraction to the first destructive hydrogenation unit during a time period when catalyst is being replaced in the second destructive hydrogenation unit.

Embodiment 57: The system of any one of embodiments 54-56, further comprising a reactor for hydrodesulfurizing the fuel oil fraction to produce an ultra-low sulfur fuel oil.

Embodiment 58: The system of any one of embodiments 54-57, comprising:
a separator for separating the hydrotreated and hydrocracked effluent and the light boiling fraction to produce a light naphtha fraction and a heavy naphtha fraction;
a flow line for feeding the light naphtha fraction to the steam cracker unit; and
a flow line for feeding the heavy naphtha fraction to the aromatics complex.

Embodiment 59: A system for converting whole crudes and other wide boiling hydrocarbon streams to produce olefins and/or aromatics, the system comprising:
a separation system for separating a whole crude into at least a first fraction, a second fraction, and a third fraction, wherein:
the first fraction has a BMCI of less than 20 and a hydrogen content of greater than 13 wt %;
the third fraction has a BMCI of greater than 30 and a hydrogen content of less than 13 wt %;

and the second fraction has a BMCI and a hydrogen content intermediate the respective values for the first and third fractions;

a hydrocracker for hydrocracking the third fraction to form a hydrocracked effluent, and a separator for separating the hydrocracked effluent to produce a resid hydrocracked fraction and a fuel oil fraction;

a conditioning zone for destructively hydrogenating and hydrocracking the second fraction and the resid hydrocracked fraction to produce a hydrotreated and hydrocracked effluent;

one or more flow lines for feeding the hydrotreated and hydrocracked effluent and the first fraction to at least one of a steam cracker and an aromatics complex to convert hydrocarbons therein into petrochemicals and a pyrolysis oil and/or an ultra-low sulfur fuel oil (ULSFO).

Embodiment 60: A system for converting whole crudes and other wide boiling hydrocarbon streams to produce olefins and/or aromatics, the system comprising:

a separation system for separating a whole crude into at least a light boiling fraction, a medium boiling fraction, and a high boiling residue fraction;

a hydrocracker for hydrocracking the high boiling residue fraction and a heavy fraction to form a hydrocracked effluent, and a separator for separating the hydrocracked effluent to produce a resid hydrocracked fraction and a fuel oil fraction;

a conditioning zone for destructively hydrogenating and hydrocracking the medium boiling fraction and the resid hydrocracked fraction to produce a hydrotreated and hydrocracked effluent;

a separator for separating the hydrotreated and hydrocracked effluent to produce a light fraction and the heavy fraction;

a separator for separating the light fraction and the light boiling fraction to recover a light naphtha fraction and a heavy naphtha fraction;

a steam cracker for converting the light naphtha fraction into petrochemicals including ethylene, propylene, and butenes; and an aromatics complex for converting the heavy naphtha into petrochemicals including benzene, toluene, and xylenes.

Embodiment 61: The system of embodiment 60, further comprising a mixer for mixing a slurry oil with the high boiling residue fraction upstream of the hydrocracker for hydrocracking the high boiling residue fraction.

Embodiment 62: The system of embodiment 60 or 61, further comprising a mixer for mixing a light cycle oil with the medium boiling fraction.

Embodiment 63: A system for converting whole crudes and other wide boiling hydrocarbon streams to produce olefins and/or aromatics, the system comprising:

a separation system for separating a whole crude in a first separation device into a light boiling fraction and a remainder fraction;

a separation system for separating the reminder fraction in a second separation device into a medium boiling fraction and a high boiling residue fraction;

a hydrocracker for hydrocracking the high boiling residue fraction to form a hydrocracked effluent;

a separator for separating the hydrocracked effluent to produce a first converted fraction and a first heavy fraction;

a hydrocracker for hydrocracking the first heavy fraction to form a second hydrocracked effluent;

a separator for separating the second hydrocracked effluent to produce a resid hydrocracked fraction and a fuel oil fraction;

a conditioning reactor for destructively hydrogenating the medium boiling fraction, the first converted fraction, and the resid hydrocracked fraction to produce a hydrotreated effluent;

a separator for separating the hydrotreated effluent to produce a lights fraction comprising hydrogen and hydrogen sulfide, a sour water stream, and a hydrotreated fraction;

a hydrocracker for hydrocracking the hydrotreated fraction and a pyrolysis oil fraction to produce a second hydrocracked effluent;

a separator for separating the second hydrocracked effluent to recover a lights fraction comprising hydrogen and a hydrocracked fraction;

a separator for separator the light fraction and the hydrocracked fraction to recover a light naphtha fraction and a heavy naphtha fraction;

a steam cracker for converting the light naphtha fraction into petrochemicals including ethylene, propylene, and butenes; and an aromatics complex for converting the heavy naphtha fraction into petrochemicals including benzene, toluene, and xylenes.

Embodiment 64: The system of any one of embodiments 46-63, wherein the separation system for separating the whole crude comprises:

a heater for heating the whole crude to produce a heated whole crude;

a separator for separating the heated whole crude to recover a first fraction and a remainder fraction;

a heater for heating the remainder fraction to produce a heated remainder fraction;

a hot hydrogen stripper for separating the heated remainder fraction to produce an overheads comprising hydrogen and a second fraction and a bottoms comprising a third fraction.

Embodiment 65: The system of embodiment 64, further comprising a heat exchanger for exchanging heat between the remainder fraction and the bottoms.

While the disclosure includes a limited number of embodiments, those skilled in the art, having benefit of this disclosure, will appreciate that other embodiments may be devised which do not depart from the scope of the present disclosure.

We claim:

1. A system for converting whole crudes and other wide boiling hydrocarbon streams to produce olefins and/or aromatics, the system comprising:

a separation system for separating a whole crude into at least a light boiling fraction, a medium boiling fraction, and a high boiling residue fraction;

a hydrocracker for hydrocracking the high boiling residue fraction to form a hydrocracked effluent, and separating the hydrocracked effluent to produce a resid hydrocracked fraction and a fuel oil fraction;

a first conditioning reactor for destructively hydrogenating the medium boiling fraction to form a first destructively hydrogenated effluent;

a second conditioning reactor for destructively hydrogenating the resid hydrocracked fraction to produce a second destructively hydrogenated effluent;

a mixer for mixing the first and second destructively hydrogenated effluents to form a mixture and a hydrocracker for hydrocracking the mixture to form produce a hydrotreated and hydrocracked effluent;

one or more flow lines for feeding the hydrotreated and hydrocracked effluent and the light boiling fraction to at least one of a steam cracker and an aromatics complex to convert hydrocarbons therein into petrochemicals and a pyrolysis oil and/or an ultra-low sulfur fuel oil (ULSFO).

2. The system of claim 1, wherein the hydrocracker for hydrocracking the high boiling residue fraction comprises a slurry reactor or an ebullated bed reactor.

3. The system of claim 2, further comprising a flow line for diverting the resid hydrocracked fraction to the first destructive hydrogenation unit during a time period when catalyst is being replaced in the second destructive hydrogenation unit.

4. The system of claim 1, further comprising a reactor for hydrodesulfurizing the fuel oil fraction to produce an ultra-low sulfur fuel oil.

5. The system of claim 1, comprising:
a separator for separating the hydrotreated and hydrocracked effluent and the light boiling fraction to produce a light naphtha fraction and a heavy naphtha fraction;
a flow line for feeding the light naphtha fraction to the steam cracker unit; and
a flow line for feeding the heavy naphtha fraction to the aromatics complex.

6. The system of claim 1, wherein the separation system for separating the whole crude comprises:
a heater for heating the whole crude to produce a heated whole crude;
a separator for separating the heated whole crude to recover a first fraction and a remainder fraction;
a heater for heating the remainder fraction to produce a heated remainder fraction;
a hot hydrogen stripper for separating the heated remainder fraction to produce an overheads comprising hydrogen and a second fraction and a bottoms comprising a third fraction.

7. The system of claim 6, further comprising a heat exchanger for exchanging heat between the remainder fraction and the bottoms.

8. A system for converting whole crudes and other wide boiling hydrocarbon streams to produce olefins and/or aromatics, the system comprising:
a separation system for separating a whole crude into at least a light boiling fraction, a medium boiling fraction, and a high boiling residue fraction;
a hydrocracker for hydrocracking the high boiling residue fraction and a heavy fraction to form a hydrocracked effluent, and a separator for separating the hydrocracked effluent to produce a resid hydrocracked fraction and a fuel oil fraction;
a conditioning zone for destructively hydrogenating and hydrocracking the medium boiling fraction and the resid hydrocracked fraction to produce a hydrotreated and hydrocracked effluent;
a separator for separating the hydrotreated and hydrocracked effluent to produce a light fraction and the heavy fraction;
a separator for separating the light fraction and the light boiling fraction to recover a light naphtha fraction and a heavy naphtha fraction;
a steam cracker for converting the light naphtha fraction into petrochemicals including ethylene, propylene, and butenes; and
an aromatics complex for converting the heavy naphtha into petrochemicals including benzene, toluene, and xylenes.

9. The system of claim 8, further comprising a mixer for mixing a slurry oil with the high boiling residue fraction upstream of the hydrocracker for hydrocracking the high boiling residue fraction.

10. The system of claim 8, further comprising a mixer for mixing a light cycle oil with the medium boiling fraction.

11. A system for converting whole crudes and other wide boiling hydrocarbon streams to produce olefins and/or aromatics, the system comprising:
a separation system for separating a whole crude in a first separation device into a light boiling fraction and a remainder fraction;
a separation system for separating the reminder fraction in a second separation device into a medium boiling fraction and a high boiling residue fraction;
a hydrocracker for hydrocracking the high boiling residue fraction to form a hydrocracked effluent;
a separator for separating the hydrocracked effluent to produce a first converted fraction and a first heavy fraction;
a hydrocracker for hydrocracking the first heavy fraction to form a second hydrocracked effluent;
a separator for separating the second hydrocracked effluent to produce a resid hydrocracked fraction and a fuel oil fraction;
a conditioning reactor for destructively hydrogenating the medium boiling fraction, the first converted fraction, and the resid hydrocracked fraction to produce a hydrotreated effluent;
a separator for separating the hydrotreated effluent to produce a lights fraction comprising hydrogen and hydrogen sulfide, a sour water stream, and a hydrotreated fraction;
a hydrocracker for hydrocracking the hydrotreated fraction and a pyrolysis oil fraction to produce a second hydrocracked effluent;
a separator for separating the second hydrocracked effluent to recover a lights fraction comprising hydrogen and a hydrocracked fraction;
a separator for separator the light fraction and the hydrocracked fraction to recover a light naphtha fraction and a heavy naphtha fraction;
a steam cracker for converting the light naphtha fraction into petrochemicals including ethylene, propylene, and butenes; and
an aromatics complex for converting the heavy naphtha fraction into petrochemicals including benzene, toluene, and xylenes.

12. The system of claim 11, wherein the separation system for separating the whole crude comprises:
a heater for heating the whole crude to produce a heated whole crude;
a separator for separating the heated whole crude to recover a first fraction and a remainder fraction;
a heater for heating the remainder fraction to produce a heated remainder fraction;
a hot hydrogen stripper for separating the heated remainder fraction to produce an overheads comprising hydrogen and a second fraction and a bottoms comprising a third fraction.

13. The system of claim 11, further comprising a heat exchanger for exchanging heat between the remainder fraction and the bottoms.

* * * * *